US010785387B2

(12) United States Patent
Kim et al.

(10) Patent No.: US 10,785,387 B2
(45) Date of Patent: Sep. 22, 2020

(54) ELECTRONIC DEVICE FOR TAKING MOVING PICTURE BY ADJUSTING THRESHOLD ASSOCIATED WITH MOVEMENT OF OBJECT IN REGION OF INTEREST ACCORDING TO MOVEMENT OF ELECTRONIC DEVICE AND METHOD FOR OPERATING SAME

(71) Applicant: Samsung Electronics Co., Ltd., Suwon-si, Gyeonggi-do (KR)

(72) Inventors: Dongsoo Kim, Suwon-si (KR); Shuichi Shimokawa, Suwon-si (KR); Hwayoung Kang, Suwon-si (KR); Donghoon Kim, Suwon-si (KR); Yeotak Youn, Suwon-si (KR); Youngkwon Yoon, Suwon-si (KR); Hyeoncheol Jo, Suwon-si (KR); Jonghun Won, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 16/272,560

(22) Filed: Feb. 11, 2019

(65) Prior Publication Data

US 2019/0260914 A1   Aug. 22, 2019

(30) Foreign Application Priority Data

Feb. 22, 2018 (KR) .................. 10-2018-0021068

(51) Int. Cl.
*H04N 5/14* (2006.01)
*H04N 5/232* (2006.01)
*G06K 9/32* (2006.01)

(52) U.S. Cl.
CPC ........... *H04N 5/144* (2013.01); *G06K 9/3233* (2013.01); *H04N 5/23254* (2013.01); *H04N 5/23258* (2013.01); *H04N 5/232935* (2018.08)

(58) Field of Classification Search
CPC .............. H04N 5/144; H04N 5/23254; H04N 5/232935; H04N 5/23258; H04N 5/23287; H04N 5/232; G06K 9/3233
(Continued)

(56) References Cited

U.S. PATENT DOCUMENTS 8,055,092 B2    11/2011  Kang
2012/0008834 A1  1/2012  Chandrasekaran et al.
(Continued)

FOREIGN PATENT DOCUMENTS

JP        2013146017 A      7/2013

OTHER PUBLICATIONS

ISA/KR, "International Search Report and Written Opinion of the International Searching Authority," International Application No. PCT/KR2019/001952, dated May 24, 2019, 8 pages.

*Primary Examiner* — Allen C Wong

(57) ABSTRACT

An electronic device may comprise a camera, a sensor circuit, a memory, and a processor configured to obtain a plurality of first images including a region of interest (ROI) based on a first frame rate using the camera, detect a movement of the electronic device using the sensor circuit, identify a threshold related to a movement of the ROI based on the movement of the electronic device, wherein the threshold related to a movement of the ROI is identified as a first threshold, and the threshold related to the movement of the ROI is identified as a second threshold larger than the first threshold, obtain a plurality of second images based on a second frame rate larger than the first frame rate in response to an object moving at the first threshold or the
(Continued)

second threshold in the ROI, and provide a video related to the object.

20 Claims, 14 Drawing Sheets

(58) Field of Classification Search
USPC .......................................................... 348/700
See application file for complete search history.

(56) References Cited

U.S. PATENT DOCUMENTS

| 2012/0176505 | A1* | 7/2012 | Kim | ..................... | H04N 5/3454 |
| | | | | | 348/222.1 |
| 2013/0129144 | A1* | 5/2013 | Chang | ..................... | G06K 9/62 |
| | | | | | 382/103 |
| 2015/0063632 | A1 | 3/2015 | Deng et al. | | |
| 2017/0200472 | A1 | 7/2017 | Munukutla et al. | | |
| 2017/0270375 | A1* | 9/2017 | Grauer | ................. | G06K 9/6293 |

* cited by examiner

| ROI Siz => | | ≥ 4x4<br>(320x320 pixels) | 3x3<br>(240x240 pixels) | 2x2<br>(160x160 pixels) | ≤ x1<br>(80x80 pixels) |
|---|---|---|---|---|---|
| Table 1<br>(High illuminance,<br>normal) | Offset | 0 | 1 | 1 | 4 |
| | Coeff | 1.8 | 1.3 | 1.3 | 1.3 |
| Table 2<br>(High illuminance,<br>mounted) | Offset | 1 | 1 | 1 | 4 |
| | Coeff | 1.1 | 1.3 | 1.3 | 1.3 |
| Table 3<br>(Low illuminance) | Offset | 1 | 1 | 1 | 4 |
| | Coeff | 1.4 | 1.4 | 1.4 | 1.3 |

FIG.10

ELECTRONIC DEVICE FOR TAKING
MOVING PICTURE BY ADJUSTING
THRESHOLD ASSOCIATED WITH
MOVEMENT OF OBJECT IN REGION OF
INTEREST ACCORDING TO MOVEMENT
OF ELECTRONIC DEVICE AND METHOD
FOR OPERATING SAME

CROSS-REFERENCE TO RELATED
APPLICATION

This application is based on and claims priority under 35 U.S.C. § 119 to Korean Patent Application No. 10-2018-0021068, filed on Feb. 22, 2018, in the Korean Intellectual Property Office, the disclosure of which is incorporated by reference herein in its entirety.

BACKGROUND

1. Field

Various embodiments relate to electronic devices for recording videos in super slow motion and methods for operating the same.

2. Description of Related Art

Recently, electronic devices have been providing more diversified services and additional functions. Various applications executable on electronic devices are being developed to meet the diverse demand of users and to raise the utility of electronic devices.

Camera applications are among these various applications, and a user may take a selfie or background using the camera of their electronic device. The electronic device may include a camera module for capturing images. The camera module may typically include a lens for collecting light, a photodiode for converting the collected light into an electrical signal, and an analog-to-digital converter (ADC) for converting the electrical signal, which is an analog signal, into a digital electrical signal. The process of a camera module that converts electrical signals from multiple photodiodes into digital electrical signals and outputs the digital electrical signals may be called 'read-out'.

Super slow motion video recording uses dedicated equipment with a superior processing capability and large storage. Portable electronic devices are subject to significant limitations in super slow motion video recording due to limitations of their memory and processor. Upon recording video in super slow motion under the same conditions without considering the state of the electronic device, the electronic device would fail to produce a super slow motion video in the user's desired quality. When the electronic device is set to begin recording super slow motion video based on the movement of an object in the region of interest (ROI), the electronic device may determine its own movement as movement of the object in the ROI, erroneously initiating super slow motion recording.

The above information is presented as background information only to assist with an understanding of the disclosure. No determination has been made, and no assertion is made, as to whether any of the above might be applicable as prior art with regard to the disclosure.

SUMMARY

According to an embodiment, an electronic device may set the conditions for super slow motion video recording based on illuminance information and movement information about the surroundings of the electronic device and perform super slow motion video recording under the conditions. According to an embodiment, an electronic device may identify the movement of an object in an ROI in an image frame or an object in the background region outside the RIO and perform super slow motion video recording.

According to an embodiment, an electronic device may comprise a camera, a sensor circuit, a memory, and a processor configured to obtain a plurality of first images including a region of interest (ROI) based on a first frame rate using the camera, detect the movement of the electronic device using the sensor circuit, identify a threshold related to a movement of the ROI based on the movement of the electronic device, wherein the threshold related to the movement of the ROI is identified as a first threshold based on the movement of the electronic device meeting a first predetermined range, and the threshold related to the movement of the ROI is identified as a second threshold larger than the first threshold based on the movement of the electronic device meeting a second predetermined range larger than the first predetermined range, obtain a plurality of second images based on a second frame rate larger than the first frame rate in response to an object moving at the first threshold or the second threshold in the ROI, and provide a video related to the object using at least some of the plurality of first images and at least some of the plurality of second images.

According to an embodiment, an electronic device may comprise a camera, a memory, and a processor configured to obtain a plurality of first images including an ROI based on a first frame rate using the camera, obtain a first pixel variation in the ROI in each first image, obtain a second pixel variation in at least one background region in the each first image, obtain a plurality of second images based on a second frame rate larger than the first frame rate in response to identifying the first pixel variation exceeding a first threshold and the second pixel variation less than a second threshold, and to provide a video related to the object using at least some of the plurality of first images and at least some of the plurality of second images.

According to an embodiment, a method for operating an electronic device configured to record a video may comprise obtaining a plurality of first images including an ROI based on a first frame rate using a camera, detecting the movement of the electronic device using a sensor circuit, identifying a threshold related to a movement of the ROI based on the movement of the electronic device, wherein the threshold related to the movement of the ROI is identified as a first threshold based on the movement of the electronic device meeting a first predetermined range, and the threshold related to the movement of the ROI is identified as a second threshold larger than the first threshold based on the movement of the electronic device meeting a second predetermined range larger than the first predetermined range, obtaining a plurality of second images based on a second frame rate larger than the first frame rate in response to an object moving at the first threshold or the second threshold in the ROI, and providing the video related to the object by using at least some of the plurality of first images and at least some of the plurality of second images.

According to an embodiment, a method for operating an electronic device configured to record a video may comprise obtaining a plurality of first images including an ROI based on a first frame rate using a camera, obtaining a first pixel variation in the ROI in each first image, obtaining a second pixel variation in at least one background region in the each first image, obtaining a plurality of second images based on a second frame rate larger than the first frame rate in response to identifying the first pixel variation exceeding a first threshold and the second pixel variation less than a second threshold, and providing the video related to the object by using at least some of the plurality of first images and at least some of the plurality of second images.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIG. 10 is a table representing weights to identify a threshold related to an object moving in an ROI based on at least of a movement or illuminance of an electronic device or the size of the ROI according to an embodiment;

Throughout the drawings, like reference numerals will be understood to refer to like parts, components, and structures.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
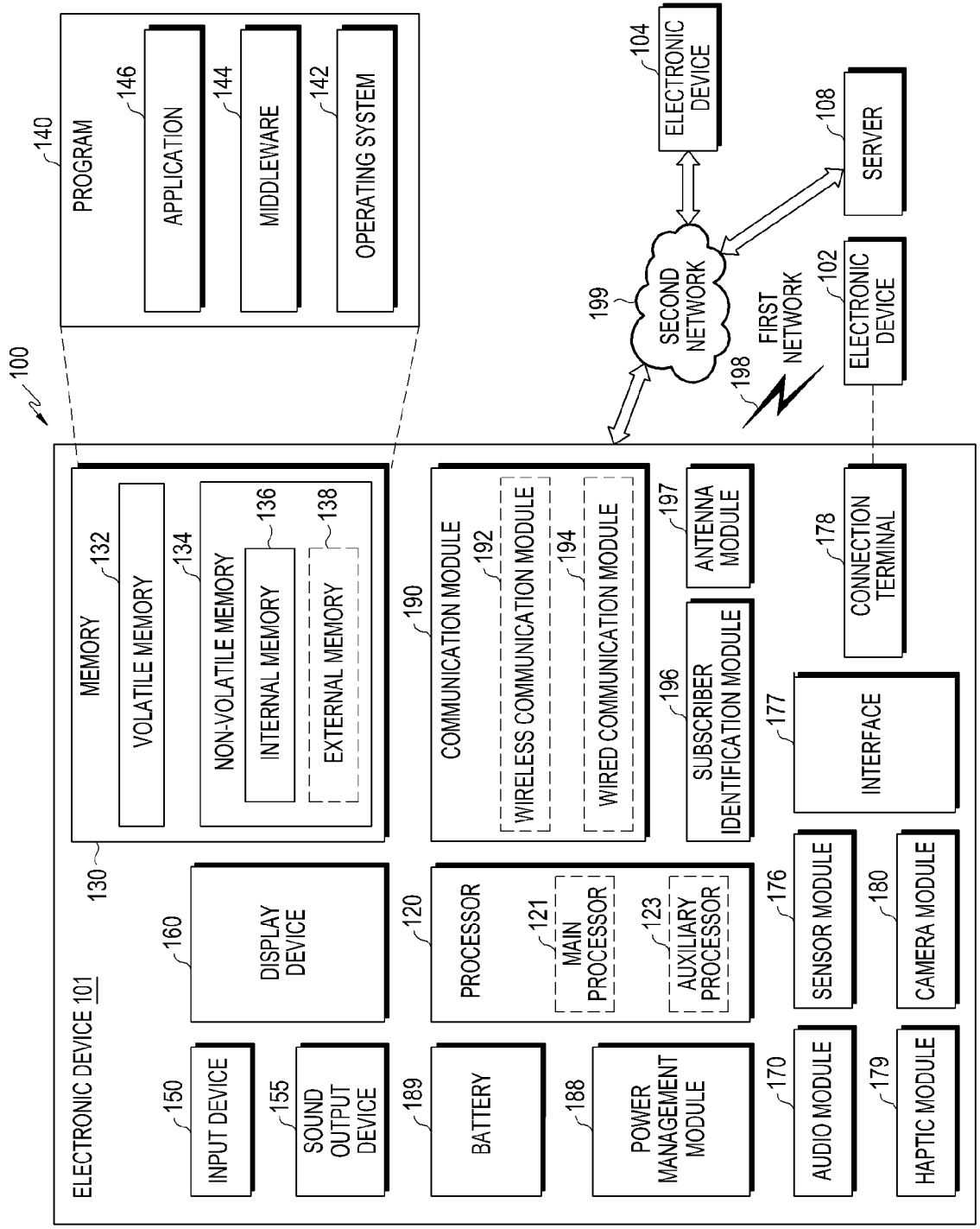
FIG. 1 is a view illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then provide an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
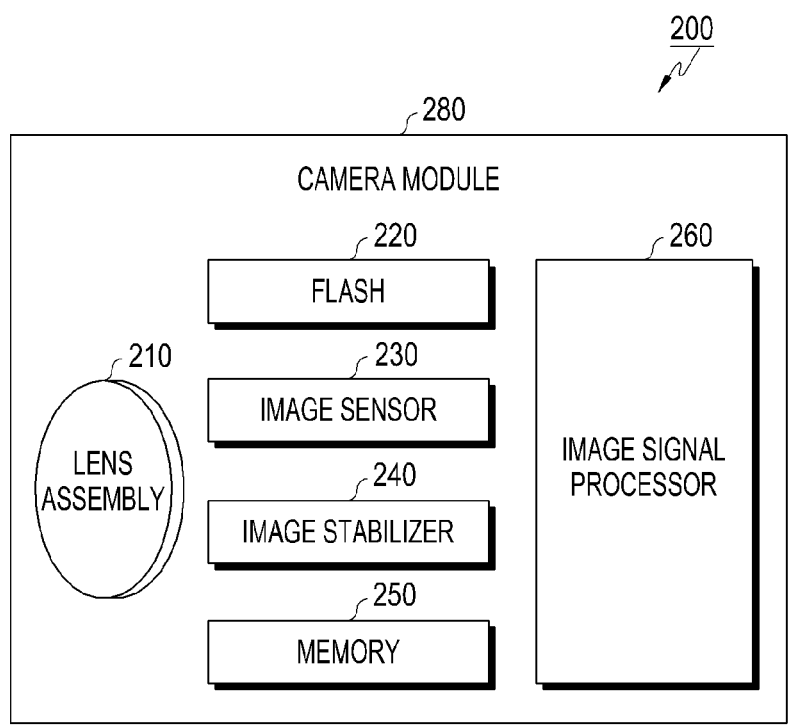
FIG. 2 is a block diagram illustrating a camera module according to an embodiment.

FIG. 2 is a block diagram 200 illustrating the camera module 280 (e.g., the camera module 180 of FIG. 1) according to various embodiments. Referring to FIG. 2, the camera module 280 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 280 may include a plurality of lens assemblies 210. In such a case, the camera module 280 may form, for example, a dual camera, a 360-degree camera, or a spherical camera. Some of the plurality of lens assemblies 210 may include the same lens attribute (e.g., view angle, focal length, auto-focusing, f number, or optical zoom), or at least one lens assembly may include one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 280 or the electronic device 101 including the camera module 180. This allows compensating for at least part of a negative effect (e.g., image blurring) by the movement on an image being captured. According to an embodiment, the image stabilizer 240 may detect such a movement by the camera module 280 or the electronic device 101 using a gyro sensor (not shown) or an acceleration sensor (not shown) disposed inside or outside the camera module 280. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 280. An image processed by the image signal processor 260 may be stored back in the memory 250 for further processing, or may be provided to an external component (e.g., the memory 130, the display device 160, the electronic device 102, the electronic device 104, or the server 108) outside the camera module 280. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 280 having different attributes or functions. In such a case, at least one of the plurality of camera modules 280 may form, for example, a wide-angle camera and at least another of the plurality of camera modules 180 may form a telephoto camera. Similarly, at least one of the plurality of camera modules 280 may form, for example, a front camera and at least another of the plurality of camera modules 180 may form a rear camera.

Figure 3:
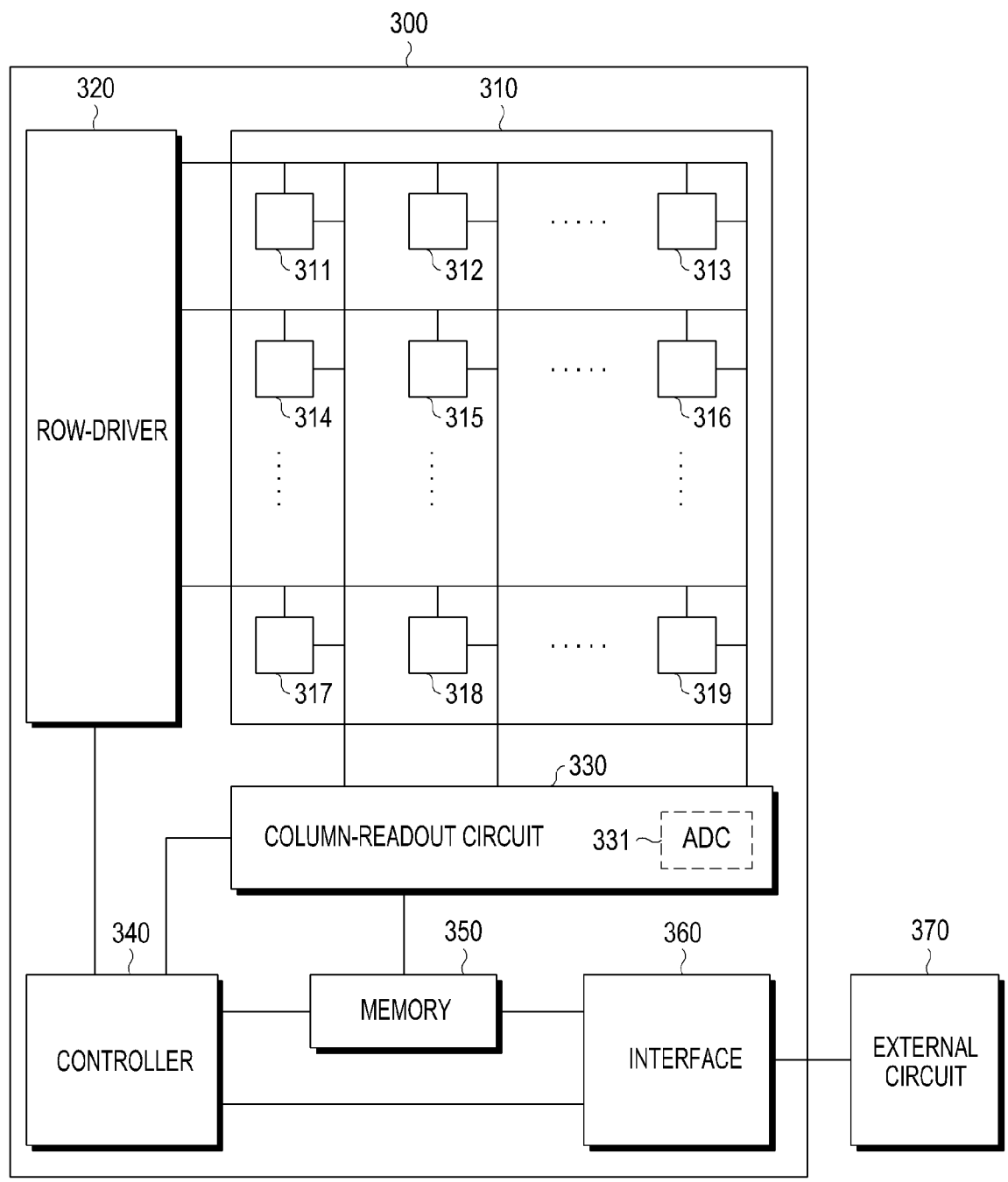
FIG. 3 is a block diagram illustrating a structure of an image sensor according to an embodiment.

FIG. 3 is a block diagram illustrating a structure of an image sensor according to an embodiment of the disclosure.

According to an embodiment of the disclosure, an image sensor 300 may be a component of a camera module (e.g., 180 or 280) in an electronic device (e.g., 101).

Referring to FIG. 3, according to an embodiment, the image sensor 300 (e.g., the image sensor 230) may include at least one of a pixel array 310, a row-driver 320, a column-readout circuit 330, a controller 340, a memory 350, or an interface 360.

The pixel array 310 may include a plurality of pixels 311 to 319. For example, the pixel array 310 may include a structure in which the plurality of pixels 311 to 319 are arrayed in an M×N matrix pattern (where M and N are positive integers). The pixel array 310 where the plurality of pixels 311 to 319 are arrayed in a two-dimensional (2D) M×N pattern may include M rows and N columns. The pixel array 310 may include a plurality of photosensitive elements, e.g., photodiodes or pinned photodiodes. The pixel array 310 may detect light by using the plurality of photosensitive elements and convert the light into an analog electrical signal to provide an image signal.

The row-driver 320 may drive the pixel array 310 for each row. For example, the row-driver 320 may output transmission control signals to the transmission transistors of the plurality of pixels 311 to 319 in the pixel array 310, reset control signals to control reset transistors, or selection control signals to control selection transistors to the pixel array 310. The row-driver 320 may identify a row to be read out.

The column-readout circuit 330 may obtain analog electrical signals provided by the pixel array 310. For example, the column-readout circuit 330 may obtain an analog electrical signal from a column line selected among the plurality of columns constituting the pixel array 310. The column-readout circuit 330 may include an analog-digital converter (ADC) 331 that may convert the analog electrical signal obtained from the selected column line into pixel data (or a digital signal) and output the pixel data. Meanwhile, the column-readout circuit 330 that obtains an analog electrical signal from the pixel array 310, converts the obtained analog electrical signal into pixel data by using the ADC 331, and outputs the pixel data may be referred to as read-out. The column-readout circuit 330 and the ADC 331 may identify a column to be read out.

According to an embodiment of the disclosure, the column-readout circuit 330 of the image sensor 300 that supports slow motion recording may include a plurality of ADCs 331. Each of the plurality of ADCs 331 may be connected in parallel with a respective one of the plurality of photodiodes in the pixel array 310, and analog electrical signals simultaneously obtained from the plurality of photodiodes may quickly be converted into pixel data based on the parallel structure. The column-readout circuit 330 of the image sensor 300 that supports slow motion recording may perform a read-out at a high frame rate (e.g., 960 frames per second (fps)). For example, reading out at 960 fps means that obtaining an analog electrical signal from the pixel array 310, converting the obtained analog electrical signal into pixel data by using the ADC 331, and outputting the pixel data are performed once every $\frac{1}{960}$ seconds. In other words, reading out at 960 fps may mean that 960 image frames are outputted per second.

The controller 340 may obtain an image frame based on the pixel data obtained from the column-readout circuit 330. The controller 340 may output the image frame through the interface 360 to an external circuit 370 (e.g., an image signal processor (ISP), processor, communication circuit, or external server). According to an embodiment of the disclosure, the controller 340 may provide transmission control signals to control the transmission transistors of the plurality of pixels 311 to 319, reset control signals to control reset transistors, or selection control signals to control selection transistors and provide the signals to the row-driver 320. The controller 340 may provide a selection control signal to select at least one column line from among the plurality of column lines constituting the pixel array 310 and provide the signal to the column-readout circuit 330. For example, the column-readout circuit 330 may enable some of the plurality of column lines and disable the other column lines based on selection control signals provided from the controller 340. The controller 340 may be implemented in a processor (e.g., 120) including a central processing unit (CPU) or application processor (AP), a sort of block or module. When the controller 340 is implemented as a block, the controller 340 may include a subtractor for detecting the difference between, e.g., images, or a comparator for comparing images. According to an embodiment of the disclosure, the controller 340 may downsize read-out images and compare the plurality of downsized images to detect differences between the images.

The memory 350 may include a volatile and/or non-volatile memory. The memory 350 is a storage device inside the image sensor 300. The memory 350 may include a buffer memory. According to an embodiment of the disclosure, the memory 350 may temporarily store digital signals output from the column-readout circuit 330 or the controller 340. For example, the memory 350 may include at least one image frame obtained based on light obtained by the pixel array 310. The memory 350 may store at least one digital signal obtained from the external circuit 370 through the interface 360.

According to an embodiment of the disclosure, the memory 350 may store at least one image frame read out at an Nth frame rate (e.g., 960 fps) or an Mth frame rate (e.g., 120 fps) from the column-readout circuit 330 and deliver at least one image frame stored through the interface 360 to the external circuit 370 (e.g., an IPS, processor, communication circuit, or external server). In other words, the memory 350 may store at least one image frame read out once every $\frac{1}{960}$ seconds or every $\frac{1}{120}$ seconds from the column-readout circuit 330, and the memory 350 may deliver at least one image frame stored through the interface 360 to the external circuit 370. The speed at which the image frame is transferred to the external circuit 370 is not limited thereto. According to an embodiment, the electronic device 101 may transfer immediately, without storing, the read-out image frame through the interface 360 to the external circuit 370.

Meanwhile, the controller 340 may store only some of N image frames read out through the column-readout circuit 330 at the Nth frame rate (e.g., 960 fps) in the memory 350, allowing for substantially the same effect as how M image frames are obtained, which are read out at the Mth frame rate (e.g., 120 fps). For example, the controller 340 may store only one of eight image frames read out at 960 fps for $\frac{8}{960}$ seconds in the memory 350. When a plurality of image frames read out at 960 fps, only image frames selected in a 1:8 ratio are stored in the memory 350, the image frames stored in the memory 350 may be substantially the same image frames as those read out at 120 fps through the column-readout circuit 330. For example, when a video constituted of only image frames obtained at the cycle of $\frac{1}{120}$ seconds is defined as '120 fps video,' a video constituted of only image frames selected in a 1:8 ratio from among the plurality of image frames read out at 960 fps may be defined as a 120 fps video. A video constituted of only image frames read out at 120 fps through the column-readout circuit 330 may also be defined as a 120 fps video.

The interface 360 may include, e.g., the interface 177 or the communication module 190. The interface 360 may connect components of the image sensor 300, e.g., the controller 340 or the memory 350, with the external circuit 370 in a wireless or wired scheme. For example, the interface 360 may deliver at least one image frame stored in the memory 350 of the image sensor 300 to the external circuit 370, e.g., the memory (e.g., 130) of the electronic device (e.g., 101). The interface 360 may also deliver control signals from the processor (e.g., 120) of the electronic device (e.g., 101) to the controller 340 of the image sensor 300.

According to an embodiment of the disclosure, the image sensor 300 may communicate with the external circuit 370 through the interface 360, e.g., in a serial communication scheme. For example, the memory 350 of the image sensor 300 may communicate with the processor (e.g., 120) of the electronic device (e.g., 101) in an inter-integrated circuit ($I^2C$) scheme.

According to an embodiment of the disclosure, the image sensor 300 may connect with the external circuit 370 through the interface 360, e.g., an interface as defined based on the mobile industry processor interface (MIPI) protocol. For example, the memory 350 of the image sensor 300 may communicate with the processor (e.g., 120) of the electronic device (e.g., 101) based on the interface defined in the MIPI protocol. The interface 360, e.g., the interface defined based on the MIPI protocol, may deliver pixel data corresponding to the image frames stored in the memory 350 to the external circuit 370 at the cycle of $\frac{1}{120}$ seconds.

Meanwhile, while the image frames stored in the memory 350 are delivered through the interface 360 having an output speed of 240 fps to the external circuit 370 once every $\frac{1}{120}$ seconds, at least some of the image frames read out in real-time through the column-readout circuit 330 may be delivered to the external circuit 370 as preview images once every $\frac{1}{120}$ seconds. The processor 120 in the external circuit 370 may display, through the display, all or some of the image frames output as preview images from the image sensor 300 at 30 fps or 60 fps.

All or some of the above-described components 310 to 360 may be included in the image sensor 300, and each component may be configured in a single unit or multiple units. The frame rates 120 fps, 240 fps, and 960 fps, used in the above embodiments may vary depending on the settings of the electronic device or the performance of the interface.

Figure 4:
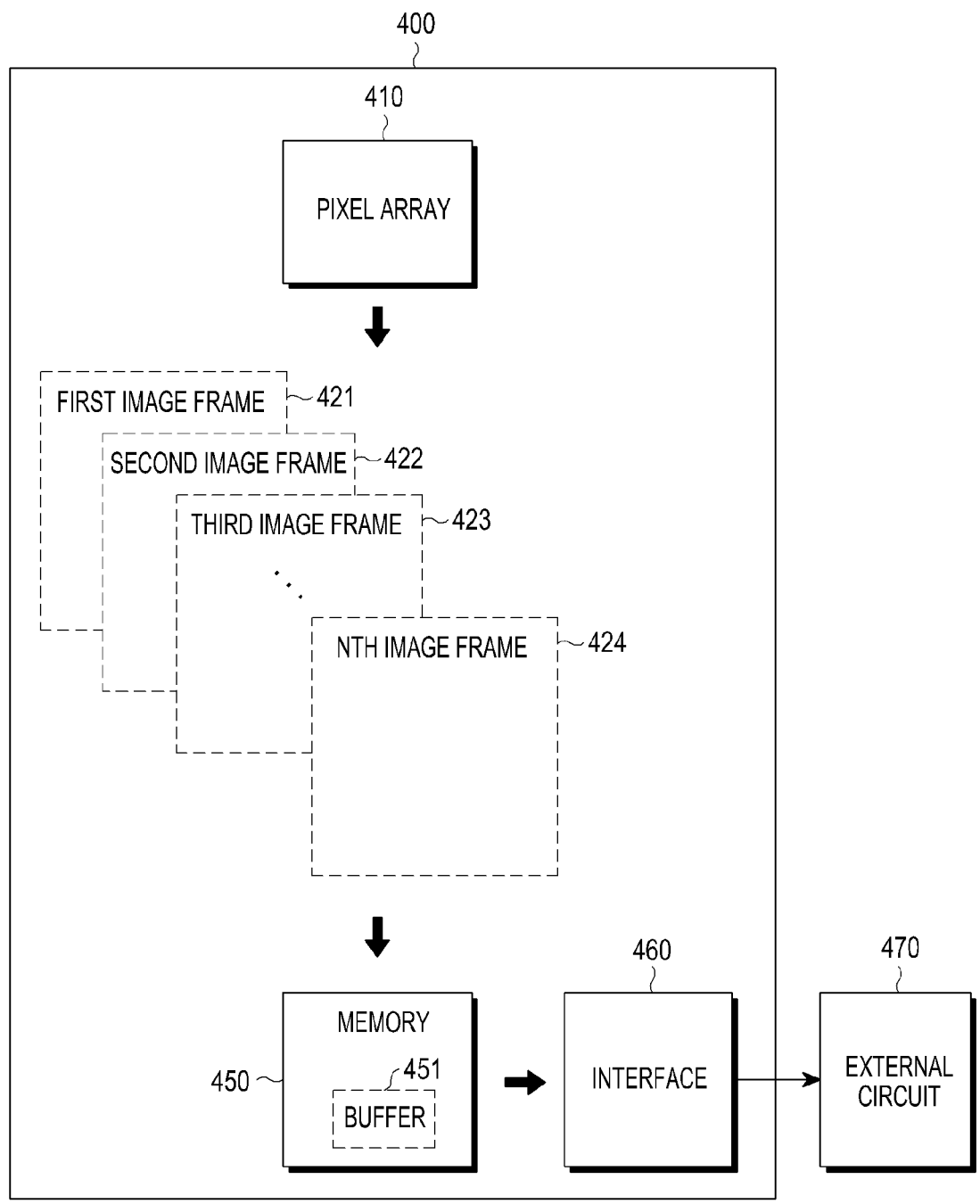
FIG. 4 is a block diagram illustrating a process for obtaining an image frame through an image sensor according to an embodiment.

FIG. 4 is a block diagram illustrating a process for obtaining an image frame through an image sensor according to an embodiment. An image sensor 400 may be a component of a camera module (e.g., 180 or 280) in an electronic device (e.g., 101).

Referring to FIG. 4, the image sensor 400 may include at least one a pixel array 410, a memory 450, and an interface 460. The image sensor 400 may include the whole or part of the image sensor 300 of FIG. 3.

The pixel array 410 of the image sensor 400 may output an electrical signal corresponding to light obtained from the outside. For example, the pixel array 410 may include a plurality of pixels constituted of photodiodes. The photodiodes may obtain light and provide analog electrical signals corresponding to the obtained light. Analog electrical signals provided from the plurality of photodiodes constituting the plurality of pixels may be converted into a plurality of pieces of pixel data through a column-readout circuit (e.g., 330). In this case, each piece of pixel data may mean a pixel value corresponding to its respective pixel. A set of a plurality of pieces of pixel data obtained at a particular time may constitute at least one image frame.

According to an embodiment of the disclosure, the pixel array 410 of the image sensor 400 may output a plurality of image frames 421 to 424 at a preset read-out speed. For example, when the read-out speed is set to 960 fps, the image sensor 400 may read-out 960 image frames every second based on light obtained by the pixel array 410. According to an embodiment, the electronic device 101 may detect an event of slow motion recording while recording in a normal mode, in which case the electronic device 101 may turn the read-out rate from 120 fps to 950 fps.

The plurality of image frames 421 to 424 read out may be stored in a memory 450 inside the image sensor 400. According to an embodiment of the disclosure, the memory 450 of the image sensor 400 may include a buffer memory 451. For example, some of the plurality of image frames 421 to 424 read out at 960 fps may be stored in the buffer memory 451. Among a plurality of image frames continuously read out, a predetermined number of image frames may be stored in the buffer memory 451. The processor (e.g., 120 or the controller 340) may repeat the operations of deleting the image frame stored earliest from among the image frames stored in the buffer memory 451 and storing the image frame latest from among the image frames.

At least one image frame stored in the memory 450 of the image sensor 400 may be delivered to an external circuit 470 through an interface 460 (e.g., 360). For example, the processor (e.g., 120 or the controller 340) may control the interface 460 to deliver at least one image frame stored in the memory 450 to the external circuit 470.

According to an embodiment, the image sensor 400 may exclude the buffer 451. The image frames 421, 422, 423, and 424 from the pixel array 410 may directly be transferred through the interface 460 to the external circuit 470.

Figure 5:
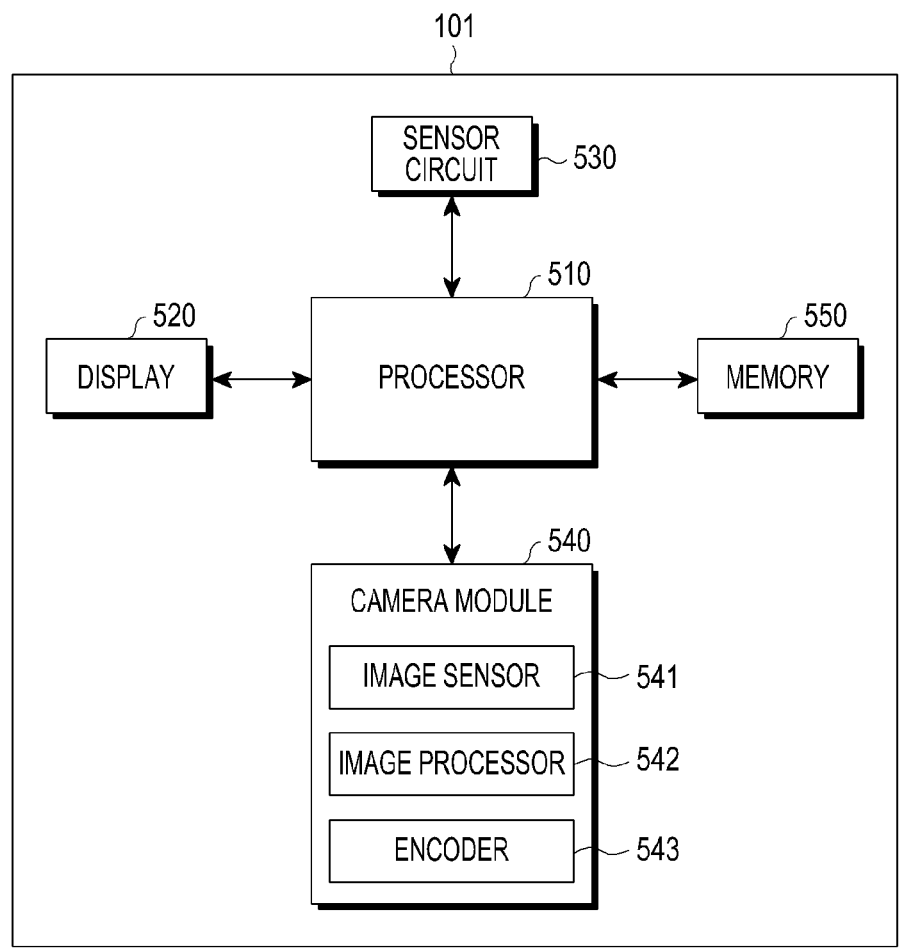
FIG. 5 is a block diagram illustrating components of an electronic device according to an embodiment.

FIG. 5 is a block diagram illustrating an electronic device 101 according to an embodiment of the disclosure. An electronic device 101 may include a processor 510, a display 520, a sensor circuit 530, a camera module 540, and a memory 550.

According to an embodiment, the processor 510 (e.g., the processor 120 of FIG. 1) may control the display 520 (e.g., the display device 160), the sensor circuit 530 (e.g., the sensor module 176), the camera module 540 (e.g., the camera module 180 or 280), and the memory 550 (e.g., the memory 130) connected with the processor 510 and perform various types of data processing or computation. For example, the processor 510 may obtain sensor data from the sensor circuit 530 and identify a reference threshold for slow motion recording using the sensor data. The processor 510 may obtain a slow motion video in response to an object (e.g., one in an image) moving at the threshold by using the camera module 540. The processor 510 may display on the display 520, or store in the memory 550, a plurality of image frames constituting the slow motion video.

According to an embodiment, the display 520 (e.g., the display device 160 of FIG. 1) may display at least one image frame obtained through the image sensor 541 (e.g., the image sensor 230 of FIG. 2). For example, the display 520 may display the preview image provided through the image processor 542 or at least one video stored in the memory 550.

According to an embodiment, the sensor circuit 530 (e.g., the sensor module 176 of FIG. 1) may detect the movement of the electronic device 101 by using at least one sensor (e.g., a gyro sensor or an acceleration sensor). The sensor circuit 530 may transfer data regarding the movement of the electronic device 101 to the processor 510 or the camera module 540.

According to an embodiment, the camera module 540 (e.g., the camera module 180 of FIG. 1 or the camera module 280 of FIG. 2) may include an image sensor 541 (e.g., the image sensor 230), an image processor 542 (e.g., the image signal processor 260), and an encoder 543. Meanwhile, at least any one of the components 541, 542, and 543 in the camera module 540 may be designed in hardware, software, firmware, or in other various forms, and each component may be termed with a different name.

According to an embodiment, the image processor 542 may obtain at least one piece of pixel data output from the image sensor 541 and process or edit the obtained pixel data for delivery to at least one component of the electronic device. The image processor 542 may resize the image frame corresponding to the pixel data obtained from the image sensor 541 to be displayed through the display 520. "Preview image" means an image that is displayed on the display 520 when the user takes an image of at least one object using the camera module 540 of the electronic device 101. At least one image frame obtained through the image sensor 541 may be displayed in real-time on the display 520 as a preview image, and the user of the electronic device may easily take images of the external object through the preview image.

According to an embodiment, the encoder 543 may provide at least one video based on the pixel data processed by the image processor 542. For example, the encoder 543 may compress an image frame corresponding to the pixel data obtained from the image sensor 541 to be stored in the memory 550. Further, the encoder 543 may encode image frames corresponding to a plurality of pieces of pixel data obtained from the image sensor 541. The encoder 543 may array the plurality of image frames in the order obtained through the image sensor 541 based on the plurality of pieces of pixel data obtained from the image sensor 541. The processor 510 may store the video encoded by the encoder 543 in the memory 550.

According to an embodiment, at least one of the image processor 542 or the encoder 543 may be included not in the camera module 540, but instead in the processor 510.

According to an embodiment, the memory 550 (e.g., the memory 130) may store at least one image frame obtained through the image sensor 541 or at least one video encoded through the encoder 543. Meanwhile, the image sensor 541 may include at least one memory (e.g., 350) in which case the memory 550 may mean a different storage space positioned in a place separated from the memory 350.

Figure 6:
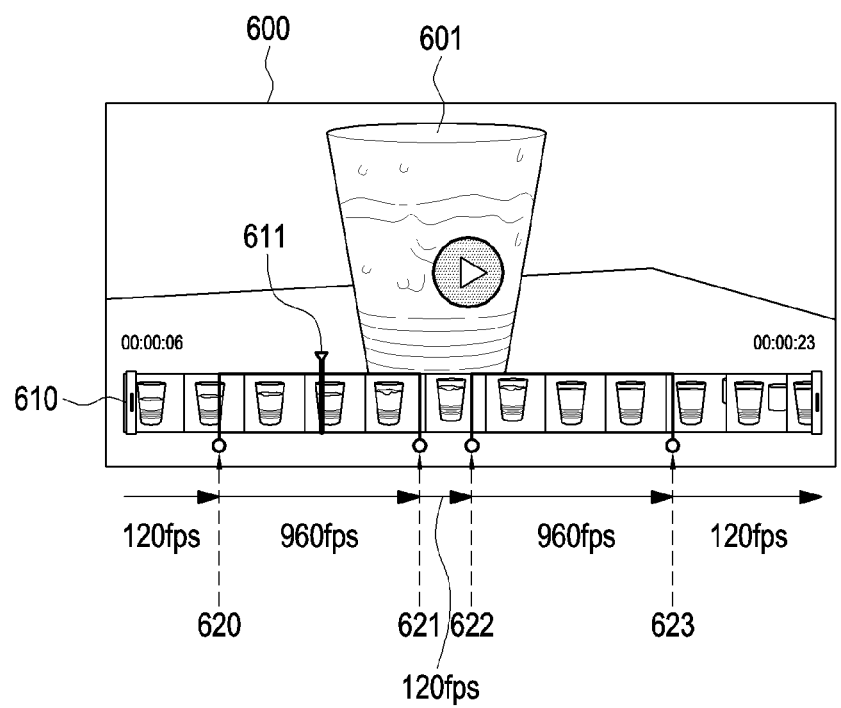
FIG. 6 is a view illustrating an example of recording a video in slow motion using an electronic device according to an embodiment.

FIG. 6 is a view illustrating a method for performing slow motion recording using an electronic device 101 according to an embodiment of the disclosure. According to an embodiment, the electronic device 101 may include an image sensor 300, a processor (e.g., 120), and a display (e.g., 160). Here, the image sensor may include at least one of a pixel array 310, a row-driver 320, a column-readout circuit 330, a controller 340, a memory 350, and an interface 360.

Referring to FIG. 6, the processor may obtain a plurality of image frames for an external object 601 through the image sensor 300, provide a video by using at least some of the obtained plurality of image frames 610, and in response to receiving a request to play video, display a video screen 600. The video may be configured as a 120 fps video or 960 fps video depending on the time when each of the image frames constituting the video is obtained and the read-out speed of the image sensor. Here, the 120 fps video means that the image frames constituting the video are obtained at the cycle of $\frac{1}{120}$ seconds, and the 960 fps video means that the image frames constituting the video are obtained at the cycle of $\frac{1}{960}$ seconds. The video screen 600 may include content 611 indicating the current position of playback.

According to an embodiment of the disclosure, the controller 340 included in the image sensor may set the read-out speed, which is the output speed of the column-readout circuit 330, as 120 fps or 960 fps, corresponding to a request related to the execution of a slow motion recording mode.

When the read-out speed is set to 120 fps or 960 fps, the column-readout circuit 330 may read-out 120 or 960 image frames every second based on light obtained by the pixel array 310.

The controller 340 may identify a pixel variation in the image frame by using at least two of the plurality of image frames read out. For example, the controller 340 may detect a pixel value variation in a particular region (e.g., at least one of the ROI or background region) based on at least two of the plurality of image frames read out through the column-readout circuit 330 before a first time 620. For example, the pixel value variation sensible through the controller 340 may include a variation based on at least one of the movement of the electronic device 101 between two image frames, the illuminance of the outside of the electronic device 101, or the size of the ROI. The controller 340 may identify a threshold for initiating slow motion recording based on the detected pixel value variation. Specifically, as described below, the threshold may be identified based on at least one of the movement of the electronic device 101, the illuminance of the outside of the electronic device 101, or the size of the ROI. The controller 340 may select a first image frame and a second image frame from among the plurality of image frames obtained through the column-readout circuit 330 before the first time 620. Based on the difference between the pixel value of the ROI in the selected first image frame and the pixel value of the ROI in the selected second image frame exceeding a preset threshold, the processor 120 may identify that the object in the ROI has moved between the time of obtaining the first image frame and the time of obtaining the second image frame. In this case, the controller 340 may set the time of obtaining the second image frame to the first time 620 and automatically start automatic slow motion recording from the first time 620.

Meanwhile, the controller 340 may deliver, through the interface 360 to the external circuit 370, a plurality of first image frames read out at 120 fps from the column-readout circuit 330 before the first time 620. For example, when the output speed of the interface 360 is 240 fps, the controller 340 may deliver, in real-time, the plurality of first image frames, which are read out at 120 fps, to the external circuit 370 without the need for storing the image frames in the memory 350. Since the interface with an output speed of 240 fps may deliver one image frame every 1/240 seconds, the controller 340 may deliver image frames used to provide a 120 fps video once every 1/120 seconds (e.g., 0 sec, 2/240 sec, 4/240 sec, . . . ) while simultaneously delivering preview images once every 1/120 seconds (e.g., 1/240 sec, 3/240 sec, 5/240 sec, . . . ). The processor in the external circuit 370 may provide a 120 fps video by using the plurality of first image frames output through the interface of the image sensor. The processor in the external circuit 370 may provide a preview by using the plurality of image frames output through the interface of the image sensor.

According to an embodiment, the controller 340 may raise the read-out speed of the column-readout circuit 330 to, e.g., 960 fps, to perform automatic slow motion recording from the first time 620 when the object in the ROI moves. When the read-out speed rises from 120 fps to 960 fps, the number of image frames obtained increases from 120 per second to 960 per second, and thus, the movement of the object in the ROI may accurately be observed. The controller 340 may deliver, through the interface 360 to the external circuit 370, a plurality of second image frames read out at 960 fps from the column-readout circuit 330 right after the first time 620. For example, when the output speed of the interface 360 is 960 fps, the controller 340 may deliver, in real-time, the plurality of second image frames, which are read out at 960 fps, to the external circuit 370 without the need for storing the image frames in the memory 350.

Meanwhile, when the output speed of the interface 360 is lower than 960 fps, the controller 340 may store the plurality of second image frames read out at 960 fps in the memory 350 and may then deliver the plurality of second image frames stored in the memory to the external circuit 370 depending on the output speed of the interface 360. For example, the controller 340 may store all of the plurality of second image frames read out at 960 fps in the memory 350. The controller 340 may deliver the plurality of second image frames stored through the interface 360 to the external circuit 370. For example, when the output speed of the interface 360 is 240 fps, the controller 340 may output a preview image at 120 fps while simultaneously outputting, at 120 fps, the plurality of second image frames stored in the memory 350. The processor in the external circuit 370 may provide a 960 fps video by using the plurality of second image frames output through the interface of the image sensor 300. The controller 340 may store the plurality of second image frames read out at 960 fps in the memory 350 while simultaneously outputting the plurality of second image frames stored in the memory 350 through the interface 360 at 120 fps. Alternatively, the controller 340 may output the plurality of second image frames stored in the memory 350 through the interface 360 at 120 fps from the moment that the storage of the memory 350 is full of the plurality of second image frames read out at 960 fps.

According to an embodiment of the disclosure, based on the storage of the memory 350 being filled up based on a second time 621, the controller 340 may pause automatic slow motion recording. The controller 340 may lower the read-out speed of the column-readout circuit 330 corresponding to pausing automatic slow motion recording. For example, the controller 340 may lower the read-out speed from 960 fps to 120 fps to deliver the read-out image frames, in real-time, to the external circuit 370 without the need for storing the image frames in the memory 350. The column-readout circuit 330 may read-out a plurality of third image frames at 120 fps from the second time 621.

Meanwhile, the controller 340 may store the plurality of second image frames read out at 960 fps from the first time 620 until the storage of the memory 350 is full, and the controller 340 may output the plurality of second image frames stored in the memory 350 from the second time 621 when the storage of the memory 350 is full. For example, when the output speed of the interface 360 is 240 fps, the controller 340 may output the plurality of second image frames stored in the memory 350 at 120 fps while simultaneously outputting, at 120 fps, a plurality of third image frames read out in real-time. The processor in the external circuit 370 may provide a 960 fps video by using the plurality of second image frames output through the interface of the image sensor. Further, the processor in the external circuit 370 may provide a 120 fps video by using the plurality of third image frames output through the interface of the image sensor.

According to an embodiment of the disclosure, the controller 340 may obtain a signal related to starting manual slow motion recording from the user at a third time 622. The controller 340 may raise the read-out speed of the column-readout circuit 330 to 960 fpls corresponding to the obtained signal related to starting manual slow motion recording. The column-readout circuit 330 may read-out a plurality of fourth image frames at 960 fps from the third time 622. The processor in the external circuit 370 may provide a 960 fps video by using the plurality of fourth image frames output through the interface of the image sensor.

According to an embodiment, based on the storage of the memory 350 being filled up at a fourth time 623, the controller 340 may pause manual slow motion recording. The controller 340 may lower the read-out speed of the column-readout circuit 330 corresponding to pausing manual slow motion recording. For example, the controller 340 may lower the read-out speed from 960 fps to 120 fps to deliver the read-out image frames, in real-time, to the external circuit 370 without the need for storing the image frames in the memory 350. The column-readout circuit 330 may read-out a plurality of fifth image frames at 120 fps from the fourth time 623. The processor in the external circuit 370 may provide a 120 fps video by using the plurality of fifth image frames output through the interface of the image sensor.

According to an embodiment of the disclosure, the controller 340 included in the image sensor may set the read-out speed, which is the output speed of the column-readout circuit 330, as 960 fps corresponding to a request related to the execution of a slow motion recording mode. When the read-out speed is set to 960 fps, the column-readout circuit 330 may read-out 960 image frames per second based on light obtained by the pixel array 310.

Meanwhile, the controller 340 may select some of the plurality of image frames read out at 960 fps in a 1:8 ratio. In other words, the controller 340 may store one out of every eight read-out image frames in the memory 350. The controller 340 may deliver the image frames stored in the memory 350 to the external circuit 370, and the processor in the external circuit 370 may provide a 120 fps video by using the delivered image frames.

Or, the controller 340 may store all of the plurality of image frames read out at 960 fps in the memory 350. The controller 340 may deliver the image frames stored in the memory 350 to the external circuit 370, and the processor 120 in the external circuit 370 may provide a 960 fps video by using the delivered image frames.

In the above embodiments, the 960 fps video obtained between the first time 620 and the second time 621 is described as an outcome of automatic slow motion recording, and the 960 fps obtained between the third time 622 and the fourth time 623 is described as an outcome of the manual slow motion recording. However, this does not intend to limit the order of automatic slow motion recording and manual slow motion recording. Automatic slow motion recording and manual slow motion recording may selectively be performed, and they may be performed three or more times.

In the above embodiments, the controller 340 in the image sensor 300 has been described as the entity for all the operations. However, this is merely an example for one or more processors in the electronic device, and the operations based on the embodiments may also be performed by other various processors in the electronic device 101, as well as by the controller 340. For example, in various embodiments set forth herein, the controller 340 may be referred to as a first processor, and the processor 120 or 510 in the external circuit 370 may be referred to as a second processor. The frame rates, e.g., 120 fps or 960 fps, used in the above embodiments may vary depending on the settings of the electronic device or the performance of the interface.

Figure 7A:
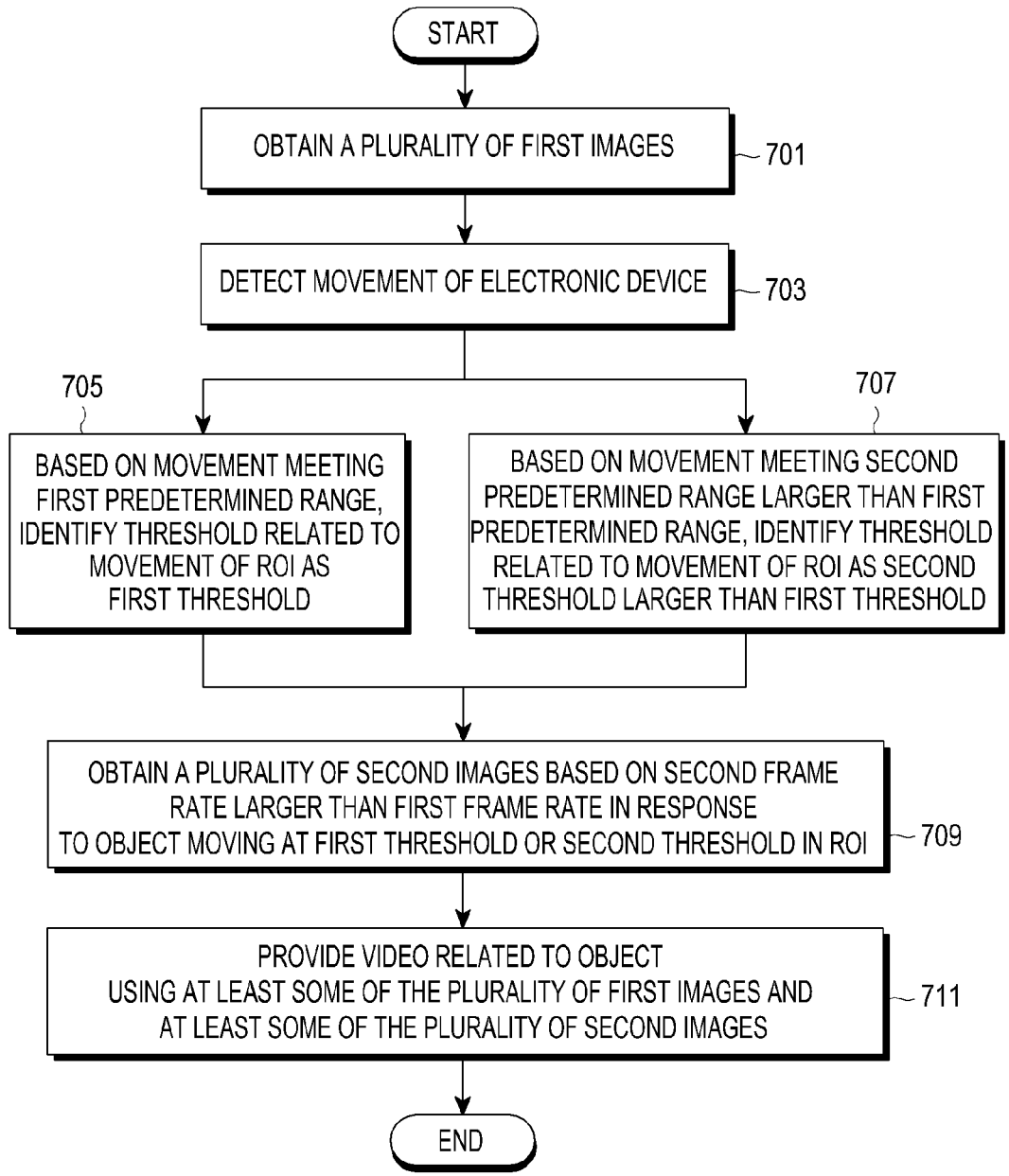
FIG. 7A is a flowchart illustrating a method of recording a video in slow motion using an electronic device according to an embodiment.

FIG. 7A is a flowchart illustrating a method of recording a video in slow motion using an electronic device 101 according to an embodiment. The embodiment of FIG. 7A is described in detail with reference to FIGS. 7B, 8, and 9.

Figure 7B:
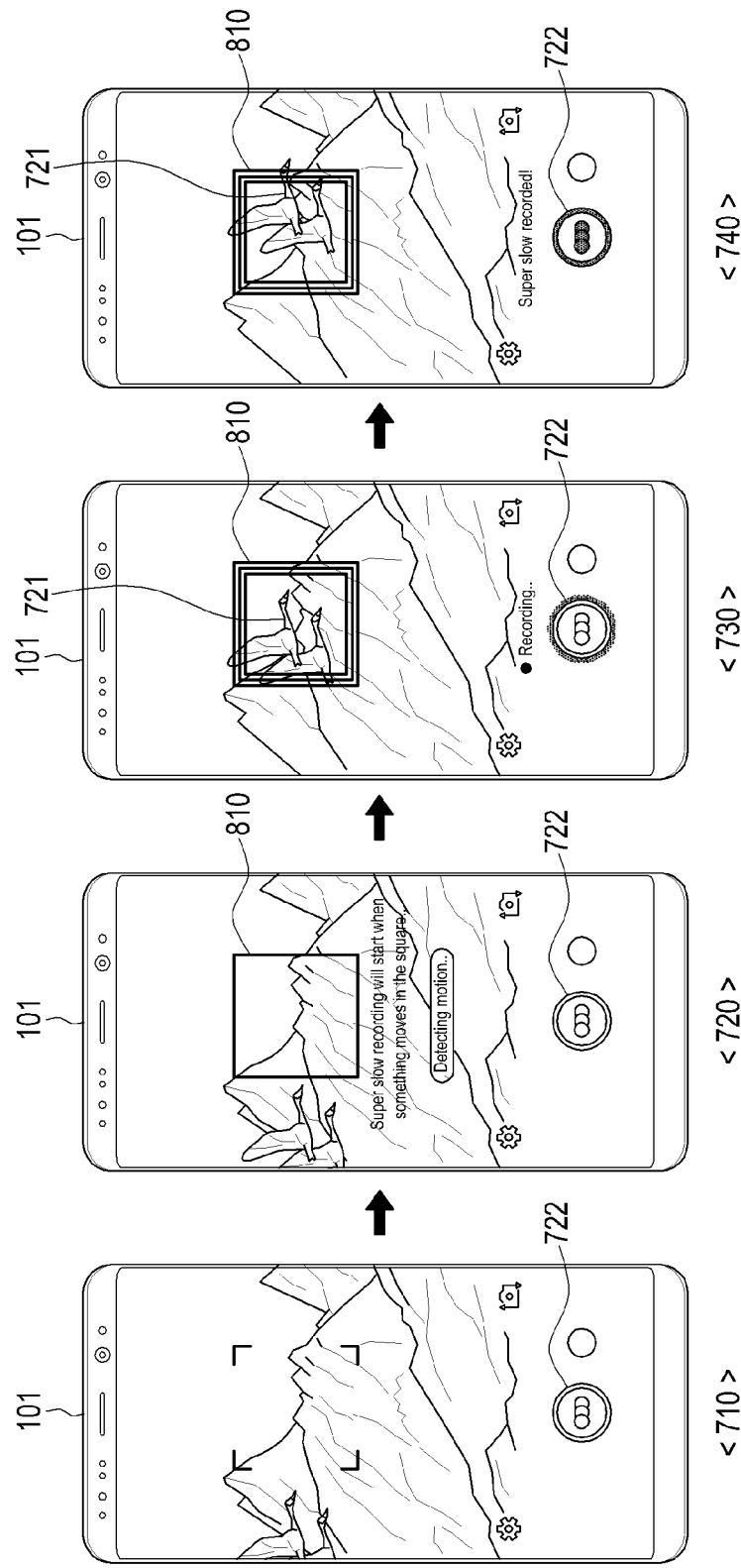
FIG. 7B is a view illustrating an example in which an electronic device records a video in slow motion in response to a movement of an object in an ROI, according to an embodiment.
Figure 8:
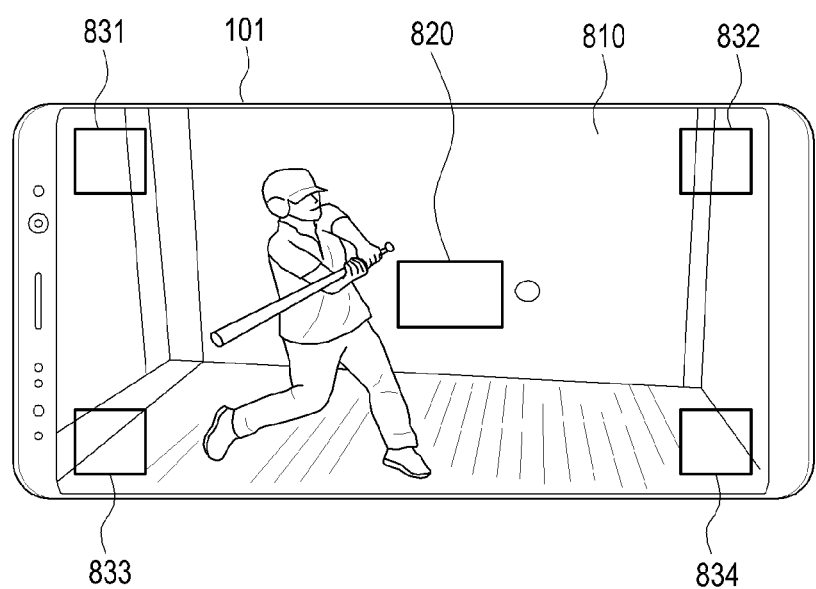
FIG. 8 is a view illustrating an example of detecting a movement of an electronic device using at least one background region or ROI in an image according to an embodiment.
Figure 9:
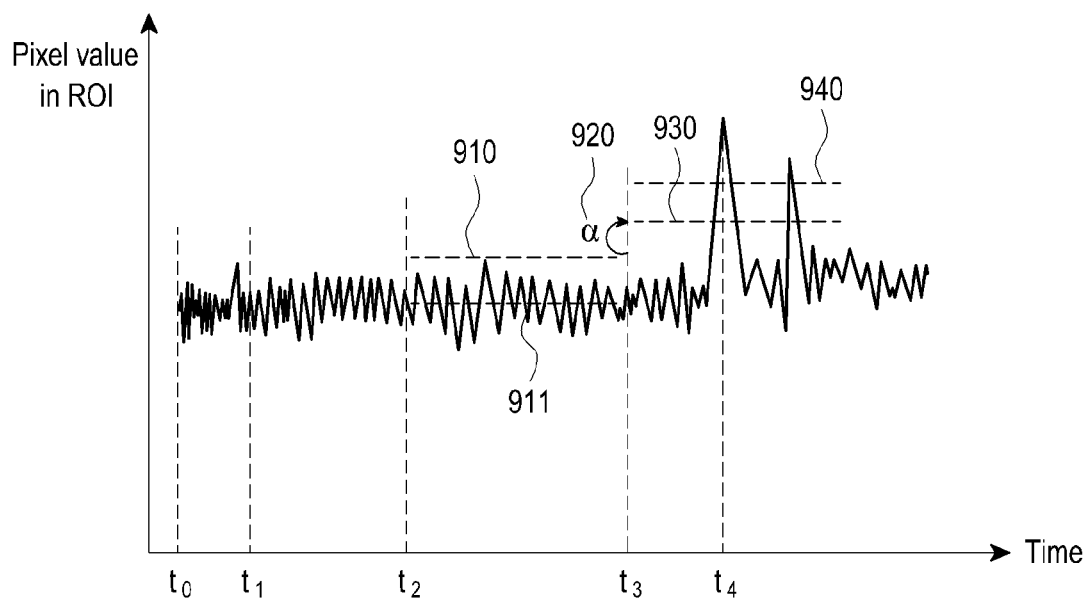
FIG. 9 is a graph illustrating a variation, over time, in pixel value in an ROI corresponding to a movement of an electronic device according to an embodiment.
Figure 9:
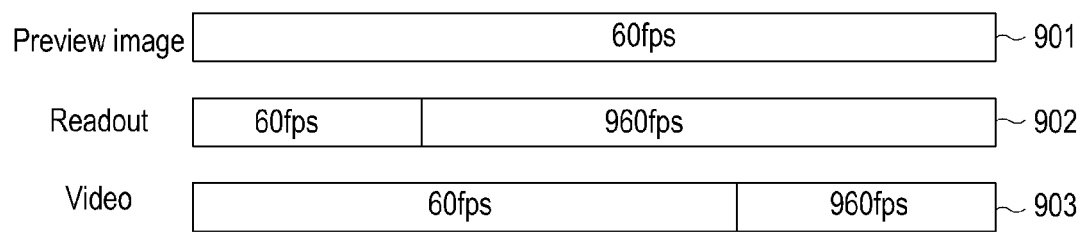

FIG. 7B is a view illustrating an example in which an electronic device 101 records a video in slow motion in response to the movement of an object in an ROI 810, according to an embodiment. FIG. 8 is a view illustrating an example of detecting the movement of an electronic device by using at least one background region 831, 832, 833, and 834 or ROI 820 in an image according to an embodiment. FIG. 9 is a graph illustrating a variation, over time, in pixel value in an ROI corresponding to the movement of an electronic device 101 according to an embodiment.

According to an embodiment, in operation 701, an electronic device 101 (e.g., the processor 120) may obtain a plurality of first images including an ROI based on a first frame rate by using the camera module 180. For example, in response to receiving an input regarding video recording from the user, the electronic device 101 may obtain the plurality of first images based on the first frame rate (e.g., 30 fps or 60 fps). The plurality of first images each may include an ROI. The electronic device 101 may set a range of interest of an object or subject to identify to initiate slow motion recording through the ROI.

According to an embodiment, the electronic device 101 may identify the movement of the electronic device 101 during a predetermined time by using the sensor module 176. According to an embodiment, the electronic device 101 may identify sensor data through the sensor module 176 during the predetermined time, and based on the sensor data being less than a threshold, the electronic device 101 may identify that there is no movement of the electronic device 101. According to an embodiment, based on there being no movement of the electronic device 101 during the predetermined time, the electronic device 101 may operate in slow motion recording standby mode. According to an embodiment, the slow motion recording standby mode may mean a state to initiate slow motion recording, as a state to identify the movement of an object in the ROI 810.

According to an embodiment, the electronic device 101 may identify the reception of a user input related to the slow motion recording standby mode. For example, as shown in <710> and <720> of FIG. 7B, the electronic device 101 may operate in the slow motion recording standby mode in response to the reception of a user input through a slow motion recording-related user interface 722.

According to an embodiment, the electronic device 101 may abstain from displaying, or may deactivate, the ROI 810 until before operating in the slow motion recording standby mode. For example, as shown in <710> of FIG. 7B, the electronic device 101 may abstain from displaying, or may deactivate, the ROI 810 until before operating in the slow motion recording standby mode. According to an embodiment, in response to operating in the slow motion recording standby mode, the electronic device 101 may display or activate the ROI 810. For example, as shown in <720> of FIG. 7B, in response to operating in the slow motion recording standby mode, the electronic device 101 may display or activate the ROI 810.

In operation 703, according to an embodiment, the electronic device 101 may detect the movement of the electronic device 101 by using the sensor module 176 in the slow motion recording standby mode. According to an embodiment, the electronic device 101 may detect the movement of the electronic device 101 based on at least one of a gyro sensor or an acceleration sensor. As a sensor to detect the movement of the electronic device 101, the gyro sensor or the acceleration sensor is merely an example, but is not limited thereto.

According to an embodiment, the electronic device 101 may detect the movement of the electronic device 101 based on at least one of the movement of an object in the background regions 831, 832, 833, and 834 of the first images or the movement of an object in the ROI 820. For example, as shown in FIG. 8, the plurality of first images may include at least one background region 831, 832, 833, and 834 or the ROI 820. The electronic device 101 may identify the movement of an object in the background region 831 based on a pixel variation in the background region and may identify the movement of an object in the ROI 820 based on the pixel variation in the ROI 820.

According to an embodiment, the electronic device 101 may set at least one background region 831, 832, 833, and 834 based on at least some of image regions displayed on the display device 160 or set a background region in an external region (e.g., the margin region of the image sensor 230) other than the image regions not displayed on the display device 160. According to an embodiment, the background regions 831, 832, 833, and 834 may be set as ones away by a preset distance from the ROI 820 set by the user or as ones including the object corresponding to the focal distance of the image sensor 230. According to an embodiment, the background regions 831, 832, 833, and 834 may be set as ones including objects positioned in the same distance as the distance between the electronic device 101 and the object in the ROI 820 or positioned within a predetermined distance range. According to an embodiment, the electronic device 101 may identify the pixel variation in the background regions whose contrast value exceeds a preset value from among the background regions 831, 832, 833, and 834 while excluding the background regions whose contrast value is not more than the preset value from among the background regions 831, 832, 833, and 834.

According to an embodiment, in operation 705, based on the movement of the electronic device 101 meeting a first predetermined range, the electronic device 101 may identify a threshold related to the movement of the ROI as a first threshold.

According to an embodiment, the electronic device 101 may identify whether the movement of the electronic device 101 meets the first predetermined range. For example, the electronic device 101 may identify whether a sensor data value obtained through the sensor module 176 meets the first predetermined value. As another example, the electronic device 101 may identify a pixel variation corresponding to the movement of an object in the background regions in the plurality of first images or a pixel variation corresponding to the movement of an object in the ROI and identify whether the pixel variation meets a second predetermined range.

According to an embodiment, based on the movement of the electronic device 101 meeting the first predetermined range, the electronic device 101 may identify the first threshold based on the pixel variation identified while the electronic device 101 moves. For example, referring to FIG. 9, the electronic device 101 may display a preview image 901 for the object being captured on the display device 160 from time t0 or from before t0. In this case, the electronic device 101 may obtain a plurality of first images read out (902) at 60 fps through the image sensor 230 and provide a 60 fps video 903 by using at least some of the plurality of first images. During video recording, the electronic device 101 may store the plurality of read-out first images in the memory 130, and during a time period from t1 to t2, the electronic device 101 may enter a mode for slow motion video recording based on the moving state of the electronic device 101 or by receiving a touch input for slow motion video recording from the user through a user interface. After t2, the electronic device 101 may change the read-out speed of the image sensor 230 from a first speed (60 fps) to a second speed (960 fps) and obtain a plurality of images. The time period from t2 to t3 relates to a standby mode in which the electronic device 101 records video in slow motion. The electronic device 101 may obtain a plurality of images read out (902) at 960 fps and provide a 60 fps video 903 by using at least some of the plurality of images. The electronic device 101 may identify a pixel variation in the ROI 820 due to the movement of the electronic device 101 and identify the maximum value 910, the mean value 911, or the second maximum value of the pixel variation. The electronic device 101 may identify a threshold that is a pixel value less than a preset value to exclude pixel values due to a sensor malfunction. The electronic device 101 may apply a weight 920 to one corresponding value (e.g., the mean value 911 or the maximum value 910) of the pixel variation and identify a first threshold 930. According to an embodiment, the electronic device 101 may identify a pixel variation in each ROI 820 or identify a variation in the mean value of all the pixels of the ROI 820, but embodiments of the disclosure are not limited thereto. According to an embodiment, the electronic device 101 may identify the first threshold 930 by using at least one of the processor 120, the image signal processor 260 in the camera module 280, or the controller 340 in the image sensor 300.

According to an embodiment, based on the reception of a signal related to video recording being a user's input received through the user interface while obtaining the plurality of first images, the electronic device 101 may identify, as the first threshold, a threshold related to the movement of the ROI based on the movement of the electronic device 101 measured after a preset period since the signal is obtained. For example, as shown in FIG. 9, the electronic device 101 may receive a touch input for slow motion video recording from the user at t1, and to disregard the movement of the electronic device 101 while the touch input occurs, the electronic device 101 may identify, as the first threshold, a threshold related to the movement of the ROI based on the movement of the electronic device 101 measured from t2 which is a time after a preset period since t1 when the touch input occurs. The video recording-related signal may include, but is not limited to, e.g., a signal for entering the super slow motion video recording standby mode based on the movement of the electronic device 101 or a user input for initiating video recording or super slow motion video recording.

According to an embodiment, the electronic device 101 may identify a threshold related to the movement of the ROI as the identified first threshold. For example, the electronic device 101 may identify a threshold related to an object moving in the ROI 820 as the identified first threshold. According to an embodiment, the threshold related to the movement of the ROI 820 may mean a reference value for slow motion video recording, based on the pixel variation due to the movement of the object in the ROI 820 being not less than the threshold. For example, as shown in FIG. 9, the electronic device 101 may identify the threshold related to the movement of the ROI 820 at t3 as the identified first threshold and identify whether the pixel variation due to the movement of the object in the ROI 820 exceeds the first threshold 930.

According to an embodiment, in operation 707, based on the movement of the electronic device 101 meeting a second predetermined range larger than the first predetermined range, the electronic device 101 may identify a threshold related to the movement of the ROI as a second threshold 940 larger than the first threshold 930.

According to an embodiment, the electronic device 101 may identify whether the movement of the electronic device 101 meets the second predetermined range. For example, the electronic device 101 may identify whether a sensor data value obtained through the sensor module 176 meets the second predetermined range larger than the first predetermined value. As another example, the electronic device 101 may identify a pixel variation corresponding to the movement of an object in the background regions in the plurality of first images or a pixel variation corresponding to the movement of an object in the ROI and identify whether the pixel variation meets the second predetermined range larger than the first predetermined range.

According to an embodiment, based on the movement of the electronic device 101 meeting the second predetermined range larger than the first predetermined range, the electronic device 101 may identify the second threshold 940 based on the pixel variation identified while the electronic device 101 moves. The method of identifying the second threshold 940 may adopt the method of identifying the first threshold 930 described above in connection with operation 705. According to an embodiment, the electronic device 101 may identify the second threshold 940 by using at least one of the processor 120, the image signal processor 260 in the camera module 280, or the controller 340 in the image sensor 300. According to an embodiment, the electronic device 101 may identify the threshold related to the movement of the ROI as the second threshold 940 based on the movement of the electronic device measured, after a preset period since a video recording-related signal while obtaining the plurality of first images. For example, referring to FIG. 9, the electronic device 101 may identify the second threshold 940 based on the movement of the electronic device 101 measured, from t2 which is a time after a preset period since t1 when a touch input occurs and may identify a threshold related to the movement of the ROI as the identified second threshold 940.

According to an embodiment, the electronic device 101 may identify the illuminance of the outside of the electronic device 101 by using the sensor module 176 (e.g., an illuminance sensor). According to an embodiment, the electronic device 101 may identify illuminance information about the outside of the electronic device 101 by using exposure information or gain information identified through the image sensor 230. According to an embodiment, the electronic device 101 may identify the threshold related to a movement of the ROI based on the movement of the electronic device and illuminance information about an outside of the electronic device obtained by using the sensor module 176. For example, the electronic device 101 may identify a pixel variation in the ROI 820 based on the movement of the electronic device 101 and the ambient illuminance about the outside of the electronic device 101 during a preset time period (e.g., the time period from t2 to t3 as shown in FIG. 9) and identify the maximum value or mean value of the pixel variation. The electronic device 101 may apply a weight to one value corresponding to the pixel variation, identifying the threshold. Based on the illuminance information meeting a third predetermined range, the electronic device 101 may identify the threshold related to the movement of the ROI 820 as a third threshold. Based on the illuminance information meeting a fourth predetermined range smaller than the third predetermined range, the electronic device 101 may identify the threshold related to the movement of the ROI 820 as a fourth threshold larger or different than the third threshold. According to an embodiment, the electronic device 101 may identify the third threshold or the fourth threshold by using at least one of the processor 120, the image signal processor 260 in the camera module 280, or the controller 340 in the image sensor 300.

According to an embodiment, the electronic device 101 may receive an input regarding the settings of the ROI 820 from the user through a user interface. For example, the electronic device 101 may receive an input regarding a position setting of the ROI 820 or an input regarding a size setting of the ROI 820 from the user. According to an embodiment, the electronic device 101 may identify a threshold related to the movement of the ROI as a fifth threshold based on the setting of the ROI 820. For example, based on the size of a first ROI being 320*320 pixels, the electronic device 101 may identify the threshold related to the movement of the first ROI to the first ROI as A value. As another example, based on the size of the second ROI being 80*80 pixels smaller than the first ROI, the electronic device 101 may identify the threshold related to the movement of the second ROI to the second ROI as B value which is larger than the A value.

According to an embodiment, in operation 709, the electronic device 101 may obtain a plurality of second images based on a second frame rate larger than the first frame rate, in response to an object moving at a corresponding one of the first threshold 930 and the second threshold 940 in the ROI set by the electronic device 101. For example, as shown in <730> of FIG. 7B, the electronic device 101 may initiate slow motion recording to obtain the plurality of second images based on the second frame rate in response to the object 721 moving at a corresponding one of the first threshold 930 and the second threshold 940. According to an embodiment, based on the pixel variation in the ROI 820 being larger than a corresponding one of the first threshold 930 and the second threshold 940, the electronic device 101 may obtain the plurality of second images based on the second frame rate. For example, as shown in FIG. 9, based on the threshold related to the movement of the ROI 820 being identified to the first threshold 930 or the second threshold 940 or based on the pixel variation due to the movement of the object in the ROI 820 being larger than the threshold related to the movement of the ROI 820 at t4, the electronic device 101 may obtain the plurality of second images (e.g., a video 903) based on the second frame rate (e.g., 960 fps). According to an embodiment, the electronic device 101 may identify the threshold related to a movement of the ROI 820 based on the movement of the electronic device and illuminance information about an outside of the electronic device obtained, and may obtain the plurality of second images based on the second frame rate larger than the first frame rate in response to the object moving at the threshold, identified based on the movement of the electronic device and the illuminance information about an outside of the electronic device, in the ROI 820. According to an embodiment, the electronic device 101 may identify the threshold related to the movement of the ROI 820 as the third threshold or the fourth threshold larger than the third threshold based on the identified illuminance information about the outside of the electronic device 101 and may obtain the plurality of second images based on the second frame rate larger than the first frame rate in response to the object moving at the third threshold or the fourth threshold in the ROI 820. For example, based on the pixel variation in the ROI 820 being larger than a corresponding one of the third threshold and the fourth threshold, the electronic device 101 may obtain the plurality of second images based on the second frame rate.

According to an embodiment, the electronic device 101 may identify the threshold related to the movement of the ROI 820 as the fifth threshold based on the size setting of the ROI 820 and obtain the second images based on the second frame rate in response to the object moving at the fifth threshold identified based on the setting of the ROI 820 in the ROI 820. For example, based on the pixel variation in the ROI 820 being larger than the fifth threshold, the electronic device 101 may obtain the plurality of second images based on the second frame rate.

According to an embodiment, based on the electronic device 101 obtaining the plurality of second images based on the second frame rate, the electronic device 101 may alter the interface related to the ROI 810 or the user interface 722 related to slow motion recording. For example, as shown in <730> of FIG. 7B, the electronic device 101 may gradually enlarge or shrink the user interface displaying the ROI 810 while obtaining the plurality of second images based on the second frame rate. As another example, as shown in <730> of FIG. 7B, the electronic device 101 may indicate that the slow motion recording-related user interface 722 is being activated while obtaining the plurality of second images based on the second frame rate.

According to an embodiment, when a predetermined time elapses from the time when the plurality of second images begin obtaining, the electronic device 101 may pause the acquisition of the plurality of second images and obtain the plurality of first images at the first frame rate. For example, as shown in <740> of FIG. 7B, when a predetermined time elapses since the slow motion recording begins, the electronic device 101 may terminate the slow motion recording by pausing the acquisition of the plurality of second images. According to an embodiment, when the electronic device 101 stores as many second images as a predetermined number of image frames or a predetermined capacity, the electronic device 101 may pause the acquisition of the plurality of second images and obtain the plurality of first images at the first frame rate. According to an embodiment, in response to identifying the reception of a user input through a user interface (not shown) related to the termination of slow motion recording, the electronic device 101 may pause the acquisition of the plurality of second images and obtain the plurality of first images at the first frame rate.

According to an embodiment, in response to pausing the acquisition of the plurality of second images, the electronic device 101 may alter the slow motion recording-related user interface 722. For example, based on the acquisition of the plurality of second images pausing as shown in <740> of FIG. 7B, the electronic device 101 may indicate that the slow motion recording-related user interface 722 is being deactivated. According to an embodiment, in operation 711, the electronic device 101 may provide a video related to the moving object by using at least some of the plurality of first images and at least some of the plurality of second images. For example, as shown in FIG. 9, the electronic device 101 may provide a 60 fps video 903 during a time period from t0 to t4 and a 960 fps video after t4. According to an embodiment, the electronic device 101 may perform operations 701 to 711 by using at least one of the processor 120, the image signal processor 260 in the camera module 280, or the controller 340 in the image sensor 300. According to an embodiment, the electronic device 101 may provide the video related to the moving object using at least some of the plurality of first images and at least some of the plurality of second images obtained in response to the object moving at the threshold identified based on the movement of the electronic device and the illuminance information about an outside of the electronic device FIG. 10 is a table representing weights to identify a threshold related to an object moving in an ROI 820 based on at least of the movement or illuminance of an electronic device 101 or the size of the ROI 820 according to an embodiment.

According to an embodiment, it is assumed that the electronic device 101 remains the same condition regarding the external illuminance of the electronic device 101 and the size of the ROI 820 but is subject to differences in movement. According to an embodiment, based on the outside of the electronic device 101 being a high illuminance, the size of the ROI 820 being 320*320 pixels, and the electronic device 101 being held in the user's hand so that the movement of the electronic device 101 due to the user's handshaking can be detected, the electronic device 101 may apply a preset first weight 1011 and a preset second weight 1012 to one corresponding value (e.g., the maximum value) among the pixel values in the ROI 820 which is varied by at least one of the movement of the electronic device 101, ambient illuminance, or the size of the ROI 820, thereby identifying a threshold. For example, the electronic device 101 may multiply one corresponding value (e.g., the maximum value) among the pixel values in the ROI 820 by the preset second weight 1012 (Coeff), e.g., 1.8, and then add the preset first weight 1011 (Offset), e.g., 0. According to an embodiment, based on the outside of the electronic device 101 including a high illuminance, the size of the ROI 820 being 320*320 pixels, and the electronic device 101 being mounted on a tripod, the electronic device 101 may apply a preset third weight 1031 and a preset fourth weight 1032 to one corresponding value (e.g., the maximum value) among the pixel values in the ROI 820 which is varied by at least one of the movement of the electronic device 101, ambient illuminance, or the size of the ROI 820, thereby identifying a threshold. For example, the electronic device 101 may multiply one corresponding value (e.g., the maximum value) among the pixel values in the ROI 820 by the preset fourth weight 1032 (Coeff), e.g., 1.1, and then add the preset third weight 1031 (Offset), e.g., 1.

According to an embodiment, it is assumed that the electronic device 101 remains the same condition regarding the external illuminance of the electronic device 101 and the movement of the electronic device 101 but is subject to differences in the size of the ROI 820. According to an embodiment, based on the outside of the electronic device 101 being a relatively high illuminance, the electronic device 101 being mounted on a tripod, and the size of the ROI 820 being 320*320 pixels, the electronic device 101 may apply the preset third weight 1031 and the preset fourth weight 1032 to one corresponding value (e.g., the maximum value) among the pixel values in the ROI 820 varied by at least one of the movement of the electronic device 101, ambient illuminance, or the size of the ROI 820, thereby identifying a threshold. For example, the electronic device 101 may multiply one corresponding value (e.g., the maximum value) among the pixel values in the ROI 820 by the preset fourth weight 1032 (Coeff), e.g., 1.1, and then add the preset third weight 1031 (Offset), e.g., 1. According to an embodiment, based on the outside of the electronic device 101 being a high illuminance, the electronic device 101 being mounted on a tripod, and the size of the ROI 820 being 80*80 pixels, the electronic device 101 may apply a preset fifth weight 1021 and a preset sixth weight 1022 to one corresponding value (e.g., the maximum value) among the pixel values in the ROI 820 varied by at least one of the movement of the electronic device 101, ambient illuminance, or the size of the ROI 820, thereby identifying a threshold. For example, the electronic device 101 may multiply one corresponding value (e.g., the maximum value) among the pixel values in the ROI 820 by the preset sixth weight 1022 (Coeff), e.g., 1.3, and then add the preset fifth weight 1021 (Offset), e.g., 4.

Although a threshold is identified by multiplying weight by a predetermined coefficient and then adding an offset above, it is appreciated by a skilled artisan that this is merely an example and identifying a threshold is not limited thereto.

Figure 11:
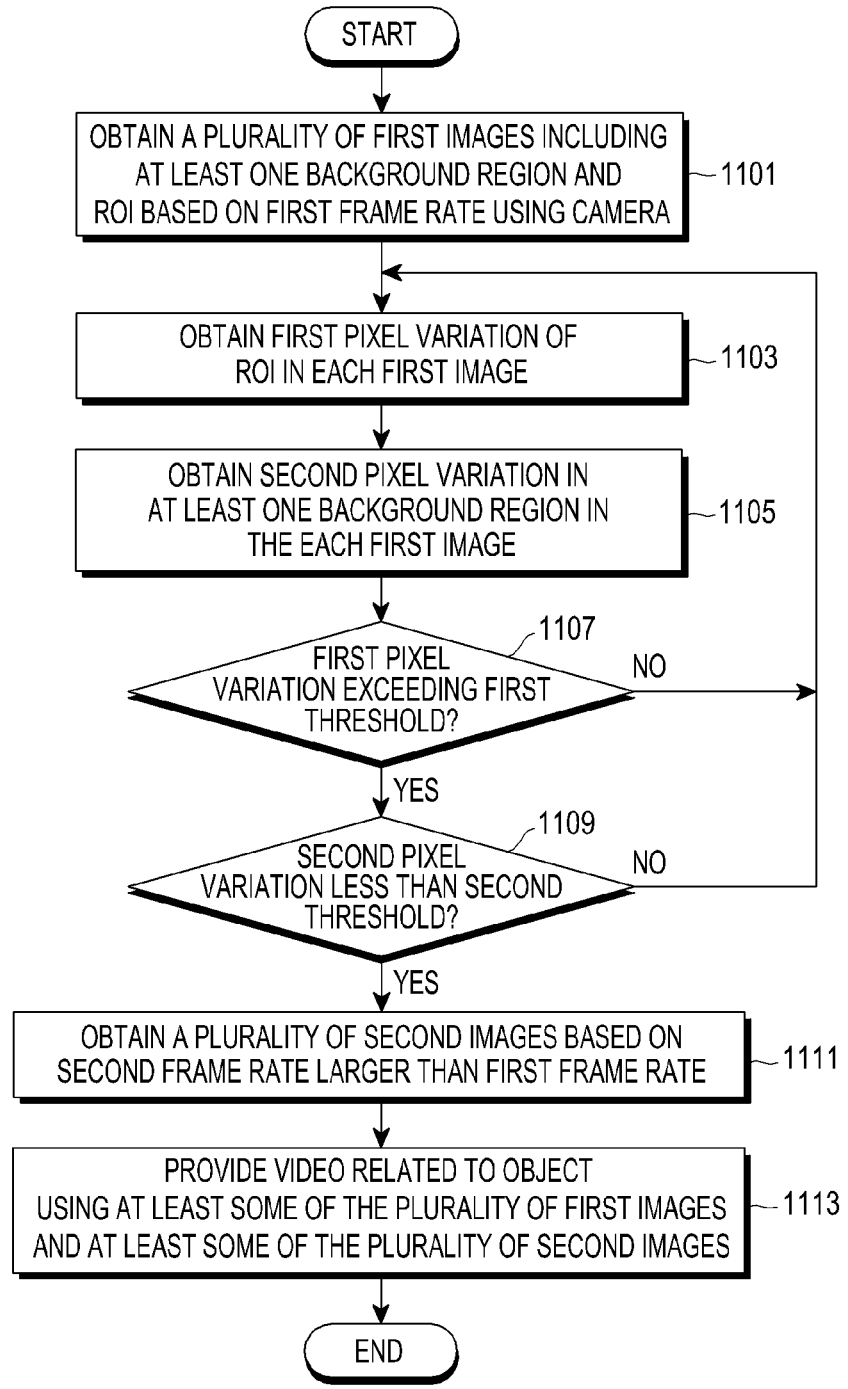
FIG. 11 is a flowchart illustrating a method for recording a video in slow motion using an ROI and background region of an electronic device according to an embodiment.
Figure 12:
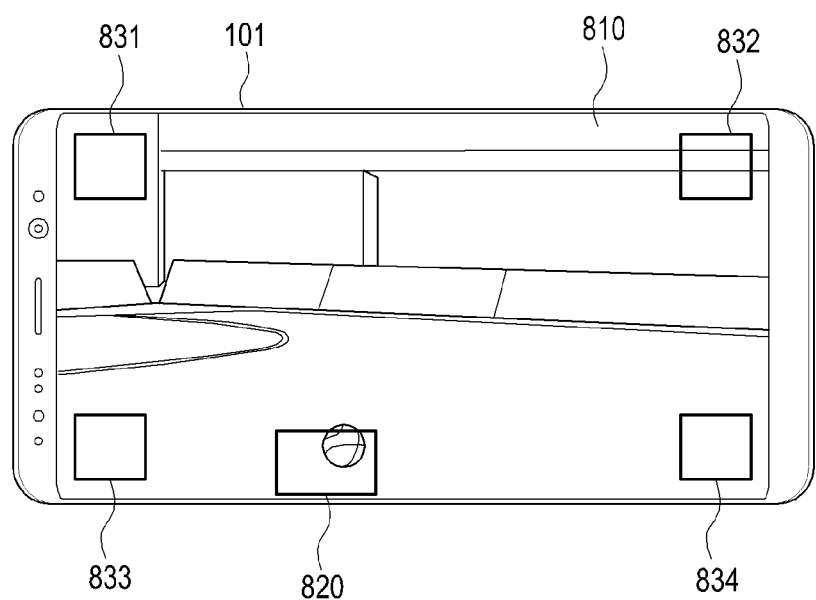
FIG. 12 is a view illustrating an example of recording a video in slow motion using an ROI and at least one background region in an image according to an embodiment.

FIG. 11 is a flowchart illustrating a method for recording a video in slow motion using an ROI 820 and background regions 831, 832, 833, and 834 of an electronic device 101 according to an embodiment. The embodiment related to FIG. 11 is described in greater detail with reference to FIG. 12. FIG. 12 is a view illustrating an example of recording a video in slow motion using an ROI 820 and at least one background region 831, 832, 833, and 834 in an image according to an embodiment.

According to an embodiment, in operation 1101, an electronic device 101 (e.g., the processor 120) may obtain a plurality of first images including an ROI 820 and at least one background region 831, 832, 833, and 834 at a first frame rate by using the camera 180. For example, the electronic device 101 may obtain images read out at 60 fps in response to a video recording start signal and store the images, as a video, in the memory 130.

According to an embodiment, in operation 1103, the electronic device 101 may obtain a first pixel variation in the ROI 820 in each of the plurality of first images. According to an embodiment, the electronic device 101 may obtain pixel variations in the ROI 820 in the Nth image frame and the ROI 820 in the N+1th image frame According to an embodiment, in operation 1105, the electronic device 101 may obtain a second pixel variation in at least one background region 831, 832, 833, and 834 in each of the plurality of first images. According to an embodiment, the electronic device 101 may obtain pixel variations in at least one background region 831, 832, 833, and 834 in the Nth image frame and at least one background region 831, 832, 833, and 834 in the N+1th image frame.

According to an embodiment, the electronic device 101 may receive an input regarding the settings of the ROI 820 from the user through a user interface, and based on at least a portion of the ROI 820 overlapping at least a portion of the at least one background region, identify the second pixel variation by using the rest of the background region other than the overlapping portion. For example, the electronic device 101 may receive an input regarding the settings of the position or size of the ROI 820 from the user through the user interface. Based on at least a portion of the ROI 820 overlapping at least a portion of the background region 831, 832, 833, and 834, the electronic device 101 may identify the second pixel variation by using the rest of the background region other than the overlapping portion to prevent a malfunction due to the movement of the object in the overlapping portion.

According to an embodiment, the electronic device 101 may set at least one background region 831, 832, 833, and 834 based on at least some of image regions displayed on the display device 160 or set a background region in an external region (e.g., the margin region of the image sensor 230) other than the image regions not displayed on the display device 160. According to an embodiment, the background regions 831, 832, 833, and 834 may be set as ones away by a preset distance from the ROI 820 set by the user or as ones including the object corresponding to the focal distance of the image sensor 230. According to an embodiment, the background regions 831, 832, 833, and 834 may be set as ones including objects positioned in the same distance as the distance between the electronic device 101 and the object in the ROI 820 or positioned within a predetermined distance range. According to an embodiment, the electronic device 101 may identify the pixel variation in the background regions whose contrast value exceeds a preset value from among the background regions 831, 832, 833, and 834 while excluding the background regions whose contrast value is not more than the preset value from among the background regions 831, 832, 833, and 834.

According to an embodiment, in operation 1107, the electronic device 101 may identify whether the first pixel variation exceeds the first threshold. For example, as shown in FIG. 12, the electronic device 101 may identify whether the first pixel variation due to the movement of the object in the ROI 820 exceeds the first threshold which is a threshold related to the object moving in the ROI 820.

According to an embodiment, in operation 1109, the electronic device 101 may identify whether the second pixel variation is less than the second threshold. To prevent it from being identified that the object in the ROI 820 is moved as the electronic device 101 shakes, the electronic device 101 may identify whether the pixel variation in the ROI 820 comes from the electronic device 101 shaking or the movement of the object by using the background regions 831, 832, 833, and 834. For example, as shown in FIG. 12, the electronic device 101 may identify whether the second pixel variation due to the movement of the object in the background regions 831, 832, 833, and 834 corresponding to the movement of the electronic device 101 is less than the second threshold which is a threshold related to the object moving in the background regions 831, 832, 833, and 834. According to an embodiment, the second threshold may be the same or different from the first threshold.

According to an embodiment, in operation 1111, in response to identifying the first pixel variation exceeding the first threshold and the second pixel variation less than the second threshold, the electronic device 101 may obtain a plurality of second images based on the second frame rate larger than the first frame rate. For example, as shown in FIG. 12, based on the object in the ROI 820 moving at a preset speed or faster, and the object in the background regions 831, 832, 833, and 834 moving slower than the preset speed, the electronic device 101 may obtain the plurality of second images based on the second frame rate (e.g., 960 fps) larger than the first frame rate (e.g., 60 fps). According to an embodiment, based on the difference between the first pixel variation in the ROI 820 and the second pixel variation in the background regions 831, 832, 833, and 834 being not less than a first predetermined value, the electronic device 101 may identify the plurality of second images based on the second frame rate larger than the first frame rate.

According to an embodiment, in operation 1113, the electronic device 101 may provide a video related to the moving object by using at least some of the plurality of first images and at least some of the plurality of second images. The method of providing the video may adopt the operations of FIG. 6 and operation 711 of FIG. 7A.

Figure 13:
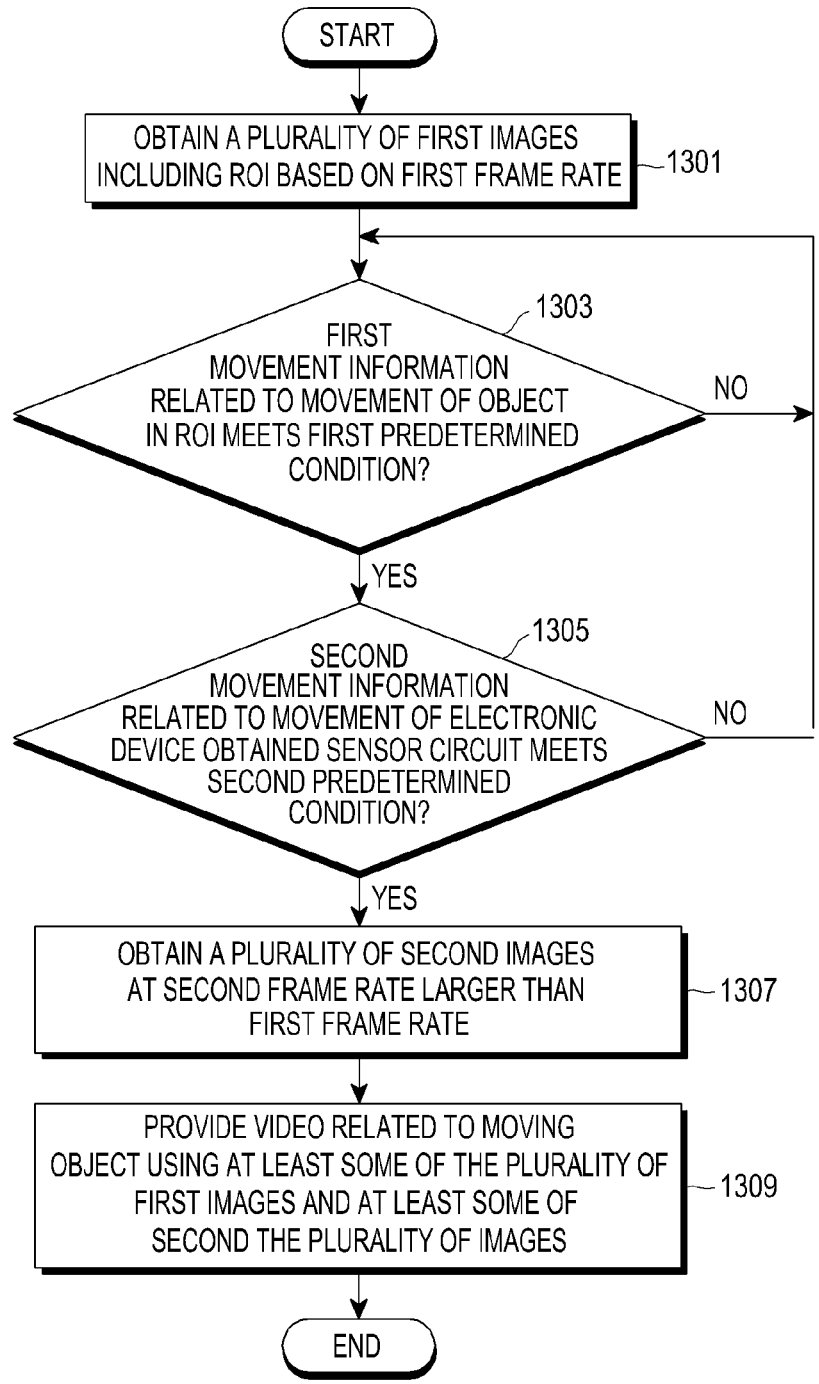
FIG. 13 is a flowchart illustrating a method for recording a video in slow motion using an ROI in an image and a sensor circuit of an electronic device according to an embodiment.

FIG. 13 is a flowchart illustrating a method for recording a video in slow motion using an ROI 820 in an image and a sensor module 176 of an electronic device 101 according to an embodiment.

According to an embodiment, in operation 1301, an electronic device 101 (e.g., the processor 120) may obtain a plurality of first images including an ROI 820 based on a first frame rate. For example, the electronic device 101 may obtain images read out at 60 fps in response to a video recording start signal and store the images, as a video, in the memory 130.

According to an embodiment, in operation 1303, the electronic device 101 may identify whether first movement information related to the movement of an object in the ROI 820 meets a first predetermined condition. According to an embodiment, the electronic device 101 may identify whether a pixel variation due to the movement of the object in the ROI 820 exceeds a threshold related to the object moving in the ROI 820. Based on the pixel variation due to the movement of the object in the ROI 820 exceeding the threshold moving in the ROI 820, the electronic device 101 may identify that the first movement information related to the movement of the object meets the first predetermined condition.

According to an embodiment, in operation 1305, the electronic device 101 may identify whether second movement information related to the movement of the electronic device 101 obtained through the sensor module 176 meets a second predetermined condition. According to an embodiment, the electronic device 101 may identify whether a variation in sensor data obtained from the sensor module 176 (e.g., an acceleration sensor or gyro sensor) is less than a preset range. Based on the variation in sensor data obtained from the sensor module 176 being less than the preset range, the electronic device 101 may identify that the second movement information related to the movement of the electronic device meets the second predetermined condition.

According to an embodiment, in operation 1307, based on the first movement information meeting the first predetermined condition, and the second movement information meets the second predetermined condition, the electronic device 101 may obtain the plurality of second images based on the second frame rate larger than the first frame rate. According to an embodiment, based on the object in the ROI 820 moving at a preset speed or faster, and the electronic device 101 moving slower than the preset speed, the electronic device 101 may obtain the plurality of second images based on the second frame rate (e.g., 960 fps) larger than the first frame rate (e.g., 60 fps).

According to an embodiment, in operation 1309, the electronic device 101 may provide a video related to the moving object by using at least some of the plurality of first images and at least some of the plurality of second images. The method of providing the video may adopt the operations of FIG. 6 and operation 711 of FIG. 7A.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code provided by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily provided or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, an electronic device 101 may comprise a camera 180, a sensor module 176, a memory 130, and a processor 120 configured to obtain a plurality of first images including a region of interest (ROI) based on a first frame rate by using the camera 180, detect the movement of the electronic device by using the sensor module 176, identify a threshold related to a movement of the ROI based on the movement of the electronic device, wherein the threshold related to a movement of the ROI is identified as a first threshold based on the movement of the electronic device meeting a first predetermined range, and the threshold related to the movement of the ROI is identified as a second threshold larger than the first threshold based on the movement of the electronic device meeting a second predetermined range larger than the first predetermined range, obtain a plurality of second images based on a second frame rate larger than the first frame rate in response to an object moving at the first threshold or the second threshold in the ROI, and provide a video related to the object by using at least some of the plurality of first images and at least some of the plurality of second images.

According to an embodiment, the processor 120 may be configured to detect the movement of the electronic device based on at least one of a gyro sensor or an acceleration sensor included in the sensor module 176.

According to an embodiment, the processor 120 may be configured to detect the movement of the electronic device based on at least one of a movement of an object in a background region of the plurality of first images or the movement of the object in the ROI.

According to an embodiment, the processor 120 may be configured to identify the threshold related to the movement of the ROI as the first threshold or the second threshold based on a pixel variation identified while the electronic device moves.

According to an embodiment, the processor 120 may be configured to, based on a signal related to video recording being a user's input received through a user interface while obtaining the plurality of first images, identifying the threshold related to the movement of the ROI as the first threshold or the second threshold based on the movement of the electronic device measured, after a preset period since the signal is obtained.

According to an embodiment, the processor 120 may be configured to identify the threshold related to a movement of the ROI based on the movement of the electronic device and illuminance information about an outside of the electronic device obtained by using the sensor circuit, obtain the plurality of second images based on the second frame rate larger than the first frame rate in response to the object moving at the threshold, identified based on the movement of the electronic device and the illuminance information about an outside of the electronic device, in the ROI, and provide the video related to the object using at least some of the plurality of first images and at least some of the plurality of second images obtained in response to the object moving at the threshold identified based on the movement of the electronic device and the illuminance information about an outside of the electronic device.

According to an embodiment, the processor 120 may be configured to receive an input related to the settings of the ROI from the user through a user interface, identify the threshold related to the movement of the ROI based on the setting of the ROI, and obtain the plurality of second images based on the second frame rate in response to the object moving at the threshold identified based on the setting of the ROI, in the ROI.

According to an embodiment, the processor 120 may be configured to obtain the plurality of second images at the second frame rate based on a pixel variation in the ROI being larger than the first threshold or the second threshold.

According to an embodiment, an electronic device 101 may comprise a camera 180, a memory 130, and a processor 120 configured to obtain a plurality of first images including an ROI based on a first frame rate by using the camera 180, obtain a first pixel variation in the ROI in each first image, obtain a second pixel variation in at least one background region in the each first image, obtain a plurality of second images based on a second frame rate larger than the first frame rate in response to identifying the first pixel variation exceeding a first threshold and the second pixel variation less than a second threshold, and provide a video related to the moving object by using at least some of the plurality of first images and at least some of the plurality of second images.

According to an embodiment, the processor 120 may be configured to receive an input related to the settings of the ROI from the user through a user interface, and based on at least a portion of the ROI overlapping at least a portion of the at least one background region, identify the second pixel variation by using the background region other than the overlapping portion.

According to an embodiment, a method for operating an electronic device configured to record a video may comprise obtaining a plurality of first images including an ROI based on a first frame rate by using a camera, detecting the movement of the electronic device using a sensor circuit, identifying a threshold related to a movement of the ROI based on the movement of the electronic device, wherein the threshold related to a movement of the ROI is identified as a first threshold based on the movement of the electronic device meeting a first predetermined range, and the threshold related to the movement of the ROI is identified as a second threshold larger than the first threshold based on the movement of the electronic device meeting a second predetermined range larger than the first predetermined range, obtaining a plurality of second images based on a second frame rate larger than the first frame rate in response to an object moving at the first threshold or the second threshold in the ROI, and providing the video related to the object by using at least some of the plurality of first images and at least some of the plurality of second images.

According to an embodiment, detecting the movement of the electronic device may include detecting the movement of the electronic device based on at least one of a gyro sensor or an acceleration sensor included in the sensor circuit.

According to an embodiment, detecting the movement of the electronic device may include detecting the movement of the electronic device based on at least one of the movement of an object in a background region of the plurality of first images or the movement of the object in the ROI.

According to an embodiment, identifying the threshold related to the movement of the ROI as the first threshold or the second threshold may include identifying the threshold related to the movement of the ROI as the first threshold or the second threshold based on a pixel variation identified while the electronic device moves.

According to an embodiment, identifying the threshold related to the movement of the ROI as the first threshold or the second threshold may include, based on a signal related to video recording being a user's input received through a user interface while obtaining the plurality of first images, identifying the threshold related to the movement of the ROI as the first threshold or the second threshold based on the movement of the electronic device measured, after a preset period since the signal is obtained.

According to an embodiment, the method may further comprise identifying the threshold related to a movement of the ROI based on the movement of the electronic device and illuminance information about an outside of the electronic device obtained by using the sensor circuit, obtaining the plurality of second images based on the second frame rate larger than the first frame rate in response to the object moving at the threshold, identified based on the movement of the electronic device and the illuminance information about an outside of the electronic device, in the ROI, and providing the video related to the object using at least some of the plurality of first images and at least some of the plurality of second images obtained in response to the object moving at the threshold identified based on the movement of the electronic device and the illuminance information about an outside of the electronic device.

According to an embodiment, the method may further comprise receiving an input related to the settings of the ROI from the user through a user interface, identifying the threshold related to the movement of the ROI based on the setting of the ROI, and obtaining the plurality of second images based on the second frame rate in response to the object moving at the threshold identified based on the setting of the ROI in the ROI.

According to an embodiment, obtaining the plurality of second images may include obtaining the plurality of second images at the second frame rate based on a pixel variation in the ROI being larger than the first threshold or the second threshold.

According to an embodiment, a method for operating an electronic device configured to record a video may comprise obtaining a plurality of first images including an ROI based on a first frame rate by using a camera, obtaining a first pixel variation in the ROI in each first image, obtaining a second pixel variation in at least one background region in the each first image, obtaining a plurality of second images based on a second frame rate larger than the first frame rate in response to identifying the first pixel variation exceeding a first threshold and the second pixel variation less than a second threshold, and providing the video related to the object by using at least some of the plurality of first images and at least some of the plurality of second images.

According to an embodiment, obtaining the second pixel variation may include receiving an input related to the settings of the ROI from the user through a user interface, and based on at least a portion of the ROI overlapping at least a portion of the at least one background region, identifying the second pixel variation by using the background region other than the overlapping portion.

As is apparent from the foregoing description, according to various embodiments, an electronic device may perform super slow motion video recording under a condition appropriate for the state of the electronic device at the time of video recording given movement or ambient illuminance information about the electronic device and may obtain a super slow motion video in the user's desired quality. According to various embodiments, there may be provided a method for allowing an electronic device to begin super slow motion video recording at the user's desired time considering the movement of an object in an ROI in an image frame or the movement of an object outside the ROI.

While the disclosure has been shown and described with reference to certain embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
   a camera;
   a sensor circuit;
   a memory; and
   a processor configured to:
      obtain a plurality of first images including a region of interest (ROI) based on a first frame rate using the camera,
      detect a movement of the electronic device using the sensor circuit,
      identify a threshold related to a movement of the ROI based on the movement of the electronic device, wherein:
         the threshold related to a movement of the ROI is identified as a first threshold based on the movement of the electronic device meeting a first predetermined range, and
         the threshold related to the movement of the ROI is identified as a second threshold that is larger than the first threshold based on the movement of the electronic device meeting a second predetermined range that is larger than the first predetermined range,
      obtain a plurality of second images based on a second frame rate that is larger than the first frame rate in response to an object moving at the first threshold or the second threshold in the ROI, and
      provide a video related to the object using at least some of the plurality of first images and at least some of the plurality of second images.

2. The electronic device of claim 1, wherein the processor is configured to detect the movement of the electronic device based on at least one of a gyro sensor or an acceleration sensor included in the sensor circuit.

3. The electronic device of claim 1, wherein the processor is configured to detect the movement of the electronic device based on at least one of a movement of an object in a background region of the plurality of first images or the movement of the object in the ROI.

4. The electronic device of claim 1, wherein the processor is configured to identify the threshold related to the movement of the ROI as the first threshold or the second threshold based on a pixel variation identified while the electronic device moves.

5. The electronic device of claim 1, wherein the processor is configured to, based on a signal related to video recording being a user's input received through a user interface while obtaining the plurality of first images, identify the threshold related to the movement of the ROI as the first threshold or the second threshold based on the movement of the electronic device measured after a preset period since the signal is obtained.

6. The electronic device of claim 1, wherein the processor is configured to:
   identify the threshold related to a movement of the ROI based on the movement of the electronic device and illuminance information about an outside of the electronic device obtained by using the sensor circuit,
   obtain the plurality of second images based on the second frame rate being larger than the first frame rate in response to the object moving at the threshold which is identified based on the movement of the electronic device and the illuminance information about an outside of the electronic device, in the ROI, and
   provide the video related to the object using at least some of the plurality of first images and at least some of the plurality of second images obtained in response to the object moving at the threshold identified based on the movement of the electronic device and the illuminance information about an outside of the electronic device.

7. The electronic device of claim 1, wherein the processor is configured to:
   receive an input related to a setting of the ROI from a user through a user interface,
   identify the threshold related to the movement of the ROI based on the setting of the ROI, and
   obtain the plurality of second images based on the second frame rate in response to the object moving in the ROI at the threshold identified based on the setting of the ROI.

8. The electronic device of claim 1, wherein the processor is configured to obtain the plurality of second images at the second frame rate based on a pixel variation in the ROI being larger than the first threshold or the second threshold.

9. An electronic device, comprising:
   a camera;
   a memory; and
   a processor configured to:
      obtain a plurality of first images including a region of interest (ROI) based on a first frame rate using the camera,
      obtain a first pixel variation in the ROI in each of the plurality of first images,
      obtain a second pixel variation in at least one background region in each of the plurality of first images,
      obtain a plurality of second images based on a second frame rate that is larger than the first frame rate in response to identifying the first pixel variation exceeding a first threshold and the second pixel variation less than a second threshold, and
      provide a video related to an object using at least some of the plurality of first images and at least some of the plurality of second images.

10. The electronic device of claim 9, wherein the processor is configured to:
   receive an input related to a setting of the ROI from a user through a user interface, and
   based on at least a portion of the ROI overlapping at least a portion of the at least one background region, identify the second pixel variation using a portion of the background region that does not include the overlapping portion.

11. A method for operating an electronic device configured to record a video, the method comprising:
   obtaining a plurality of first images including an ROI based on a first frame rate using a camera;
   detecting a movement of the electronic device using a sensor circuit;
   identifying a threshold related to a movement of the ROI based on the movement of the electronic device, wherein:
      the threshold related to a movement of the ROI is identified as a first threshold based on the movement of the electronic device meeting a first predetermined range, and
      the threshold related to the movement of the ROI is identified as a second threshold that is larger than the first threshold based on the movement of the electronic device meeting a second predetermined range that is larger than the first predetermined range;
   obtaining a plurality of second images based on a second frame rate that is larger than the first frame rate in response to an object moving at the first threshold or the second threshold in the ROI; and
   providing the video related to the object using at least some of the plurality of first images and at least some of the plurality of second images.

12. The method of claim 11, wherein detecting the movement of the electronic device includes detecting the movement of the electronic device based on at least one of a gyro sensor or an acceleration sensor included in the sensor circuit.

13. The method of claim 11, wherein detecting the movement of the electronic device includes detecting the movement of the electronic device based on at least one of a movement of an object in a background region of the plurality of first images or the movement of the object in the ROI.

14. The method of claim 11, wherein identifying the threshold related to the movement of the ROI as the first threshold or the second threshold includes identifying the threshold related to the movement of the ROI as the first threshold or the second threshold based on a pixel variation identified while the electronic device moves.

15. The method of claim 11, wherein identifying the threshold related to the movement of the ROI as the first threshold or the second threshold includes, based on a signal related to video recording being a user's input received through a user interface while obtaining the plurality of first images, identifying the threshold related to the movement of the ROI as the first threshold or the second threshold based on the movement of the electronic device measured after a preset period since the signal is obtained.

16. The method of claim 11, further comprising:
   identifying the threshold related to a movement of the ROI based on the movement of the electronic device and illuminance information about an outside of the electronic device obtained by using the sensor circuit;
   obtaining the plurality of second images based on the second frame rate being larger than the first frame rate in response to the object moving at the threshold which is identified based on the movement of the electronic device and the illuminance information about an outside of the electronic device, in the ROI; and providing the video related to the object using at least some of the plurality of first images and at least some of the plurality of second images obtained in response to the object moving at the threshold identified based on the movement of the electronic device and the illuminance information about an outside of the electronic device.

17. The method of claim 11, further comprising:

receiving an input related to a setting of the ROI from a user through a user interface;

identifying the threshold related to the movement of the ROI based on the setting of the ROI; and obtaining the plurality of second images based on the second frame rate in response to the object moving in the ROI at the threshold identified based on the setting of the ROI.

18. The method of claim 11, wherein obtaining the plurality of second images includes obtaining the plurality of second images at the second frame rate based on a pixel variation in the ROI being larger than the first threshold or the second threshold.

19. A method for operating an electronic device configured to record a video, the method comprising:

obtaining a plurality of first images including a region of interest (ROI) based on a first frame rate using a camera;

obtaining a first pixel variation in the ROI in each of the plurality of first images;

obtaining a second pixel variation in at least one background region in each of the plurality of first images;

obtaining a plurality of second images based on a second frame rate that is larger than the first frame rate in response to identifying the first pixel variation exceeding a first threshold and the second pixel variation less than a second threshold; and providing the video related to an object using at least some of the plurality of first images and at least some of the plurality of second images.

20. The method of claim 19, wherein obtaining the second pixel variation includes receiving an input related to a setting of the ROI from a user through a user interface, and based on at least a portion of the ROI overlapping at least a portion of the at least one background region, identifying the second pixel variation using a portion of the background region that does not include the overlapping portion.

* * * * *